(12) United States Patent
Kurokawa

(10) Patent No.: US 10,717,459 B2
(45) Date of Patent: Jul. 21, 2020

(54) TELESCOPIC ROTATION TRANSMISSION SHAFT AND METHOD FOR PRODUCING SAME

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 313 days.

(21) Appl. No.: 15/743,012

(22) PCT Filed: Jul. 26, 2016

(86) PCT No.: PCT/JP2016/071804
§ 371 (c)(1),
(2) Date: Jan. 9, 2018

(87) PCT Pub. No.: WO2017/018401
PCT Pub. Date: Feb. 2, 2017

(65) Prior Publication Data
US 2019/0084610 A1 Mar. 21, 2019

(30) Foreign Application Priority Data

Jul. 27, 2015 (JP) .................................. 2015-147532
Jan. 6, 2016 (JP) .................................. 2016-001014
Jan. 27, 2016 (JP) .................................. 2016-013027
Feb. 17, 2016 (JP) .................................. 2016-027464

(51) Int. Cl.
*B62D 1/20* (2006.01)
*B62D 1/185* (2006.01)
(Continued)

(52) U.S. Cl.
CPC .............. *B62D 1/20* (2013.01); *B62D 1/185* (2013.01); *F16C 3/035* (2013.01); *F16D 3/065* (2013.01);
(Continued)

(58) Field of Classification Search
CPC . B62D 1/20; B62D 1/185; F16C 3/035; F16C 2326/24; F16D 3/065; F16D 2300/12; Y10T 29/49641
(Continued)

(56) References Cited

U.S. PATENT DOCUMENTS 3,012,421 A 12/1961 Cull
10,330,141 B2 * 6/2019 Kurokawa ............. B62D 1/185
(Continued)

FOREIGN PATENT DOCUMENTS

DE 3513340 A1 10/1986
DE 3730393 A1 3/1989
(Continued)

OTHER PUBLICATIONS

Communication dated Jul. 24, 2019, issued by the Chinese Patent Office in counterpart Chinese Application No. 201680041321.3.
(Continued)

*Primary Examiner* — Greg Binda
(74) *Attorney, Agent, or Firm* — Sughrue Mion, PLLC

(57) ABSTRACT

A portion of the target guide plate interposed between the rolling surface of each ball and an inner surface of the sub-concave groove is supported at the other radial surface opposite to the rolling surface of each ball by the inner surface of the sub-concave groove at a state where one radial surface facing towards the rolling surface of each ball is pressed by the rolling surface of each ball and is thus curved along the rolling surface of each ball.

14 Claims, 11 Drawing Sheets

(51) Int. Cl.
  *F16D 3/06* (2006.01)
  *F16C 3/035* (2006.01)
(52) U.S. Cl.
  CPC ...... *F16C 2326/24* (2013.01); *F16D 2300/12* (2013.01); *Y10T 29/49641* (2015.01)
(58) Field of Classification Search
  USPC .......................................... 464/167; 384/55
  See application file for complete search history.

(56) References Cited

U.S. PATENT DOCUMENTS

| | | |
|---|---|---|
| 2007/0157754 A1 | 7/2007 | Yamada |
| 2010/0210370 A1 | 8/2010 | Kwon et al. |
| 2014/0349772 A1 | 11/2014 | Daenzer et al. |

FOREIGN PATENT DOCUMENTS

| | | |
|---|---|---|
| JP | 2007-16951 A | 1/2007 |
| JP | 2007-192340 A | 8/2007 |
| JP | 2008-6903 A | 1/2008 |
| JP | 2011-500421 A | 1/2011 |
| JP | 2011-144820 A | 7/2011 |
| JP | 5077360 B2 | 11/2012 |
| WO | 2005/070744 A1 | 8/2005 |

OTHER PUBLICATIONS

International Search Report, issued by International Searching Authority in corresponding International Application No. PCT/JP2016/071804, dated Oct. 25, 2016, (PCT/ISA/210).

Communication dated Mar. 19, 2018, issued by the European Patent Office in counterpart European Patent Application No. 16830506.8.

\* cited by examiner

TELESCOPIC ROTATION TRANSMISSION SHAFT AND METHOD FOR PRODUCING SAME

TECHNICAL FIELD

The present invention relates to improvements on an extensible rotation transmission shaft capable of transmitting a rotational force (torque) and to be used as an axially extensible shaft. As the extensible rotation transmission shaft, a steering shaft, an intermediate shaft and the like configuring a steering device for an automobile are exemplified.

RELATED ART

As shown in FIG. 7, for example, a steering device for an automobile is configured to transmit movement of a steering wheel 1 to a steering gear unit 2. The movement of the steering wheel 1 is transmitted to an input shaft 6 of the steering gear unit 2 via a steering shaft 3, a universal joint 4a, an intermediate shaft 5 and a universal joint 4b. The steering gear unit 2 is configured to push and pull a pair of right and left tie-rods 7, 7, thereby applying a desired steering angle to steered wheels. Meanwhile, in the example of FIG. 7, an electric power steering device is incorporated. In the electric power steering device, an auxiliary force corresponding to a force that is to be applied to the steering wheel 1 by a driver is applied to the steering shaft 3 by an electric motor 8.

Also, for example, Patent Documents 1 and 2 disclose the steering shaft 3 and the intermediate shaft 5 configuring the steering device as described above. According to structures disclosed in Patent Documents 1 and 2, a plurality of balls is arranged between an inner shaft and an outer shaft, so that the rotational force can be transmitted between an inner ring and an outer ring via each of the balls and axial relative displacement can be enabled between the inner ring and the outer ring.

FIGS. 8 and 9 depict an example of an extensible rotation transmission shaft (hereinafter, also referred to as "transmission shaft") capable of transmitting the rotational force and enabling the axial relative displacement (extension/retraction).

The transmission shaft shown in FIGS. 8 and 9 includes an inner shaft 9, an outer shaft 10 and a plurality of balls 11, 11.

An outer peripheral surface of the inner shaft 9 is formed with axial inner-side concave grooves 12, 12, which are recessed radially inwards, at two places in a circumferential direction. Also, the outer peripheral surface of the inner shaft 9 is provided with inner-side preliminary concave grooves 13, 13, each of which has the same shape as each of the inner-side concave grooves 12, 12 and each of the balls 11, 11 is not arranged therein at an assembled state, at positions of which phases in the circumferential direction are offset by 90 degrees with respect to the respective inner-side concave grooves 12, 12.

Also, the outer shaft 10 has a hollow cylindrical shape in which the inner shaft 9 can be inserted. An inner peripheral surface of the outer shaft 10 is formed with axial outer-side concave grooves 14, 14, which are recessed radially outwards, at two places in the circumferential direction. The outer-side concave grooves 14, 14 are formed at positions at which they are aligned with the respective inner-side concave grooves 12, 12. Also, the inner peripheral surface of the outer shaft 10 is provided with outer-side preliminary concave grooves 15, 15, each of which has the same shape as each of the outer-side concave grooves 14, 14 and each of the balls 11, 11 is not arranged therein at the assembled state, at positions of which phases in the circumferential direction are offset by 90° with respect to the respective outer-side concave grooves 14, 14.

Also, the balls 11, 11 are respectively arranged between the respective inner-side and outer-side concave grooves 12, 14. As shown in FIG. 8, the balls 11, 11 are arranged axially side by side in series between the respective inner-side and outer-side concave grooves 12, 14. The rotation can be transmitted between the inner shaft 9 and the outer shaft 10 via each of the balls 11, 11, and the inner shaft 9 and the outer shaft 10 can be axially slid relative to each other.

Regarding the above-described transmission shaft, in order to suppress the rattling and an abnormal noise and to secure a stable extension/retraction operation, guide plates are respectively incorporated between a rolling surface of each ball and the inner-side concave grooves and between the rolling surface of each ball and the outer-side concave grooves (for example, refer to Patent Document 3).

When implementing the above structure, as shown in FIG. 10, for example, it is considered to adopt a configuration where a portion of a guide plate 45 is interposed between an inner surface of a concave groove (inner-side concave groove, outer-side concave groove) 46 and a rolling surface of a ball 47. In this configuration, when a surface pressure of a contact portion between a side surface of the guide plate 45 and the rolling surface of the ball 47 increases, the durability is lowered as much as that. Therefore, in order to reduce the surface pressure of the contact portion, a structure capable of increasing an area of the contact portion is needed.

CITATION LIST

Patent Documents

Patent Document 1: Japanese Patent Application Publication No. 2008-6903A
Patent Document 2: Japanese Patent Application Publication No. 2007-16951A
Patent Document 3: Japanese Patent Application Publication No. 2011-500421A

SUMMARY OF THE INVENTION

Problems to be Solved

The present invention has been made in view of the above situations, and an object thereof is to provide a structure of an extensible rotation transmission shaft capable of securing an area of a contact portion between a side surface of a guide plate and a rolling surface of a ball to improve the durability.

Means for Solving the Problems

An extensible rotation transmission shaft to which the present invention is to be applied includes an inner shaft, an outer shaft, a plurality of balls and a guide plate.

The inner shaft is formed with an axial inner-side concave groove at at least one place of an outer peripheral surface thereof in a circumferential direction.

Also, the outer shaft is formed with an axial outer-side concave groove at at least one place of an inner peripheral surface thereof in a circumferential direction, at which it is aligned with the inner-side concave groove.

Also, the respective balls are arranged axially side by side between the inner-side concave groove and the outer-side concave groove.

Also, the guide plate is interposed between a rolling surface of each ball and an inner surface of the inner-side concave groove and/or between the rolling surface of each ball and an inner surface of the outer-side concave groove.

A rotational force can be transmitted between the inner shaft and the outer shaft via each ball (and the guide plate), and axial relative displacement can be enabled between the inner shaft and the outer shaft.

One radial surface, which is positioned at the rolling surface-side of each ball, of a target guide plate, which is at least one guide plate of the guide plates, and the rolling surface of each ball are contacted only at two contact portions spaced in the circumferential direction with a central portion in the circumferential direction being interposed therebetween.

Also, the inner surface of the inner-side concave groove or the outer-side concave groove, which faces the other radial surface of the target guide plate positioned at a side opposite to the rolling surface of each ball, is formed with a sub-concave groove at at least one place of two places in the circumferential direction (two places in the circumferential direction facing the two contact portions in a plate thickness direction of the target guide plate) of which phases in the circumferential direction coincide with the two contact portions. The sub-concave groove is preferably formed in an axial direction.

Also, a portion of the target guide plate interposed between the rolling surface of each ball and an inner surface of the sub-concave groove is supported at the other radial surface opposite to the rolling surface of each ball by the inner surface of the sub-concave groove at a state where one radial surface facing towards the rolling surface of each ball is pressed by the rolling surface of each ball and is thus curved along the rolling surface of each ball.

For example, a sectional shape of the inner surface of the sub-concave groove may be formed into a circular arc shape, and a radius of curvature of the circular arc-shaped section may be set greater than a sum of a radius of curvature of the rolling surface of each ball and a plate thickness of the portion of the target guide plate interposed between the rolling surface of each ball and the inner surface of the sub-concave groove.

For example, each ball may be applied with preload by plastically deforming an inner surface of at least one concave groove of the inner-side concave groove and the outer-side concave groove in a radial direction (for example, irrespective of an elastic force of the target guide plate).

In a method of manufacturing the extensible rotation transmission shaft of the present invention, a portion of the target guide plate interposed between the rolling surface of each ball and the inner surface of the sub-concave groove may be formed into a shape where the other radial surface opposite to the rolling surface of each ball is not contacted to the inner surface of the sub-concave groove at a state before assembling the extensible rotation transmission shaft, and may be curved (curved along the inner surface, for example) until the other radial surface opposite to the rolling surface of each ball is contacted to the inner surface of the sub-concave groove by pressing one radial surface facing towards the rolling surface of each ball by the rolling surface of each ball when assembling the extensible rotation transmission shaft.

Also, in the method of manufacturing the extensible rotation transmission shaft of the present invention, the sub-concave groove may be formed by pressing an inner surface of the concave groove, which faces the other radial surface of the target guide plate, of the inner-side concave groove or the outer-side concave groove by the rolling surface of each ball via the portion of the target guide plate interposed between the inner surface of the concave groove and the rolling surface of each ball and plastically deforming the inner surface of the concave groove.

Also, for example, the sub-concave groove may be formed to be axially continuous by relatively displacing the outer shaft and the inner shaft in the axial direction.

For example, the sub-concave groove may be formed by transmitting torque between the inner shaft and the outer shaft with the inner shaft being inserted into the outer shaft.

For example, the sub-concave groove may be formed by relatively displacing (for example, inclining) the inner shaft and the outer shaft so that central axes of the inner shaft and the outer shaft are mismatched with the inner shaft being inserted into the outer shaft.

For example, the sub-concave groove may be formed at a state before the extensible rotation transmission shaft is mounted to a vehicle.

For example, the sub-concave groove may be formed in an ex-post or additional manner at a state after the extensible rotation transmission shaft is mounted to a vehicle.

For example, hardness (surface hardness of the inner surface of at least the concave groove) of the shaft, which is formed with the sub-concave groove, of the inner shaft and the outer shaft may be set lower than hardness of each ball and hardness of the target guide plate.

For example, an inner-side guide plate interposed between the rolling surface of each ball and the inner surface of the inner-side concave groove and an outer-side guide plate interposed between the rolling surface of each ball and the inner surface of the outer-side concave groove may be respectively configured as the target guide plate. The sub-concave groove may be respectively formed on the inner surface of the inner-side concave groove and the inner surface of the outer-side concave groove.

For example, (only) the inner-side guide plate interposed between the rolling surface of each ball and the inner surface of the inner-side concave groove may be configured as the target guide plate, and the sub-concave groove may be formed only on the inner surface of the inner-side concave groove.

For example, (only) the outer-side guide plate interposed between the rolling surface of each ball and the inner surface of the inner-side concave groove may be configured as the target guide plate, and the sub-concave groove may be formed only on the inner surface of the outer-side concave groove.

An extensible rotation transmission shaft to which the present invention is to be applied may include an inner shaft, an outer shaft, a plurality of balls, an inner-side guide plate and an outer-side guide plate.

The inner shaft is formed with an axial inner-side concave groove at at least one place of an outer peripheral surface thereof in a circumferential direction.

Also, the outer shaft is formed with an axial outer-side concave groove at at least one place of an inner peripheral surface thereof in a circumferential direction, at which it is aligned with the inner-side concave groove.

Also, the respective balls are arranged axially side by side between the inner-side concave groove and the outer-side concave groove.

Also, the inner-side guide plate is interposed between a rolling surface of each ball and an inner surface of the inner-side concave groove.

Also, the outer-side guide plate is interposed between the rolling surface of each ball and an inner surface of the outer-side concave groove.

A rotational force can be transmitted between the inner shaft and the outer shaft via each ball (and the inner-side and outer-side guide plates), and axial relative displacement can be enabled between the inner shaft and the outer shaft.

The rolling surface of each ball and a radially outer surface of the inner-side guide plate are contacted only at two inner-side contact portions spaced in the circumferential direction with a central portion in the circumferential direction being interposed therebetween.

Also, the rolling surface of each ball and a radially inner surface of the outer-side guide plate are contacted only at two outer-side contact portions spaced in the circumferential direction with a central portion being interposed therebetween in the circumferential direction.

Also, at least one place of a total of four places of two places in the circumferential direction (two places in the circumferential direction facing the two inner-side contact portions in a plate thickness direction of the inner-side guide plate), of which phases in the circumferential direction coincide with the two inner-side contact portions, of the inner surface of the inner-side concave groove and two places in the circumferential direction (two places in the circumferential direction facing the two outer-side contact portions in a plate thickness direction of the outer-side guide plate), of which phases in the circumferential direction coincide with the two outer-side contact portions, of the inner surface of the outer-side concave groove is formed with the sub-groove in an axial direction.

Also, a portion of the inner-side guide plate or the outer-side guide plate interposed between the rolling surface of each ball and the inner surface of the sub-concave groove is supported at a side surface opposite to the rolling surface of each ball by the inner surface of the sub-concave groove at a state where a side surface facing towards the rolling surface of each ball is pressed by the rolling surface of each ball and is thus curved along the rolling surface of each ball.

For example, a sectional shape of the inner surface of the sub-concave groove may be formed to have a circular arc shape, and a radius of curvature of the circular arc section may be set greater than a sum of a radius of curvature of the rolling surface of each ball and a plate thickness of the portion of the inner-side guide plate or the outer-side guide plate interposed between the rolling surface of each ball and the inner surface of the sub-concave groove.

For example, each ball may be applied with preload by elastically deforming an inner surface of at least one concave groove of the inner-side concave groove and the outer-side concave groove in the radial direction (for example, irrespective of elastic forces of the inner-side guide plate and the outer-side guide plate).

In a manufacturing method of the extensible rotation transmission shaft of the present invention, a portion of the inner-side guide plate or the outer-side guide plate interposed between the rolling surface of each ball and the inner surface of the sub-concave groove may be formed into a shape where a side surface opposite to the rolling surface of each ball is not contacted to the inner surface of the sub-concave groove at a state before assembling the extensible rotation transmission shaft, and may be curved (curved along the inner surface, for example) until the side surface opposite to the rolling surface of each ball is contacted to the inner surface of the sub-concave groove by pressing a side surface facing towards the rolling surface of each ball by the rolling surface of each ball when assembling the extensible rotation transmission shaft.

Effects of the Invention

According to the extensible rotation transmission shaft of the present invention, it is possible to implement a structure capable of improving the durability by securing an area of the contact portion between the side surface of the guide plate and the rolling surface of the ball.

That is, the portion of the guide plate (the target guide plate, one or both of the inner-side guide plate and the outer-side guide plate) interposed between the rolling surface of each ball and the inner surface of the sub-concave groove is curved as the side surface facing towards the rolling surface of each ball is pressed by the rolling surface of each ball. For this reason, as the portion of the guide plate is curved, an area of the contact portion between the rolling surface of each ball and the side surface of the guide plate facing towards the rolling surface can be increased, and a surface pressure to be applied to each contact portion can be suppressed. Also, according to the present invention, compressive stress associated with the curving is applied to the portion, which corresponds to each contact portion, of the side surface of the guide plate. Therefore, it is possible to increase the strength of the portion corresponding to each contact portion. As a result, it is possible to improve the durability.

Also, the portion of the guide plate (target guide plate) interposed between the rolling surface of each ball and the inner surface of the sub-concave groove is supported at the other radial surface opposite to the rolling surface of each ball by the inner surface of the sub-concave groove at the state where the side surface facing towards the rolling surface of each ball is pressed and curved by the rolling surface of each ball. For this reason, when transmitting the rotational force between the inner shaft and the outer shaft, it is possible to prevent high bending deformation from being caused in the guide plate.

Also, as described above, it is possible to prevent the high bending deformation from being caused in the guide plate at the assembled state and upon the transmission of the rotational force. Therefore, even when the guide plate and the outer peripheral surface of the inner shaft or the inner peripheral surface of the outer shaft are contacted, it is possible to prevent the excessive wear from being caused at the contact portion.

As described above, each ball is applied with the preload by using the inner surface of at least one concave groove of the inner-side concave groove and the outer-side concave groove to be elastically deformed in the radial direction, so that the rattling of the extensible rotation transmission shaft can be suppressed. In this case, the structure capable of suppressing the rattling of the extensible rotation transmission shaft can be implemented without causing the high bending deformation in the guide plate (the inner-side guide plate, the outer-side guide plate) at the assembled state. As a result, it is possible to implement the structure capable of suppressing the rattling while preventing the damage of the guide plate and the wears of the respective parts.

As described above, the portion of the target guide plate interposed between the rolling surface of each ball and the inner surface of the sub-concave groove may be formed into a shape where the other radial surface opposite to the rolling surface of each ball is not contacted to the inner surface of the sub-concave groove at the state before assembling the extensible rotation transmission shaft, and may be curved (curved along the inner surface, for example) until the other radial surface opposite to the rolling surface of each ball is contacted to the inner surface of the sub-concave groove by pressing one radial surface facing towards the rolling surface of each ball by the rolling surface of each ball when assembling the extensible rotation transmission shaft.

In this case, when assembling the extensible rotation transmission shaft, the guide plate (target guide plate) is formed with the curved portion to which the rolling surface of each ball is to contact, and at the same time, a part of the curved portion can be introduced into the sub-concave groove. For this reason, it is possible to easily perform the operation of introducing the part of the curved portion into the sub-concave groove, irrespective of the manufacturing error of each component.

As described above, the sub-concave groove may be formed by pressing the inner surface of the concave groove, which faces the other radial surface of the target guide plate, of the inner-side concave groove or the outer-side concave groove by the rolling surface of each ball via the portion of the target guide plate interposed between the inner surface of the concave groove and the rolling surface of each ball and plastically deforming the inner surface of the concave groove.

In this case, the sub-concave groove can be formed by plastically deforming the inner surface of the concave groove, which faces the other radial surface of the guide plate (target guide plate), of the inner-side concave groove or the outer-side concave groove by using each ball. For this reason, it is possible to easily perform the forming operation of the sub-concave groove, as compared to a configuration where the sub-concave groove is formed by cutting processing or the like. Also, it is possible to effectively form the sub-concave groove at the portion of the inner surface of the concave groove, of which the circumferential phase coincides with the contact portion between the rolling surface of each ball and the guide plate.

Also, it is possible to suppress the manufacturing variations of the forming position of the sub-concave groove.

Also, it is possible to easily process the sectional shape the sub-concave groove into a shape conforming to a base line of the rolling surface of each ball (so that the radius of curvature of the sectional shape of the sub-concave groove becomes the sum of the radius of curvature of the rolling surface of each ball and the plate thickness of the guide plate).

DETAILED DESCRIPTION OF EMBODIMENTS

First Example of Embodiment

Figure 7:
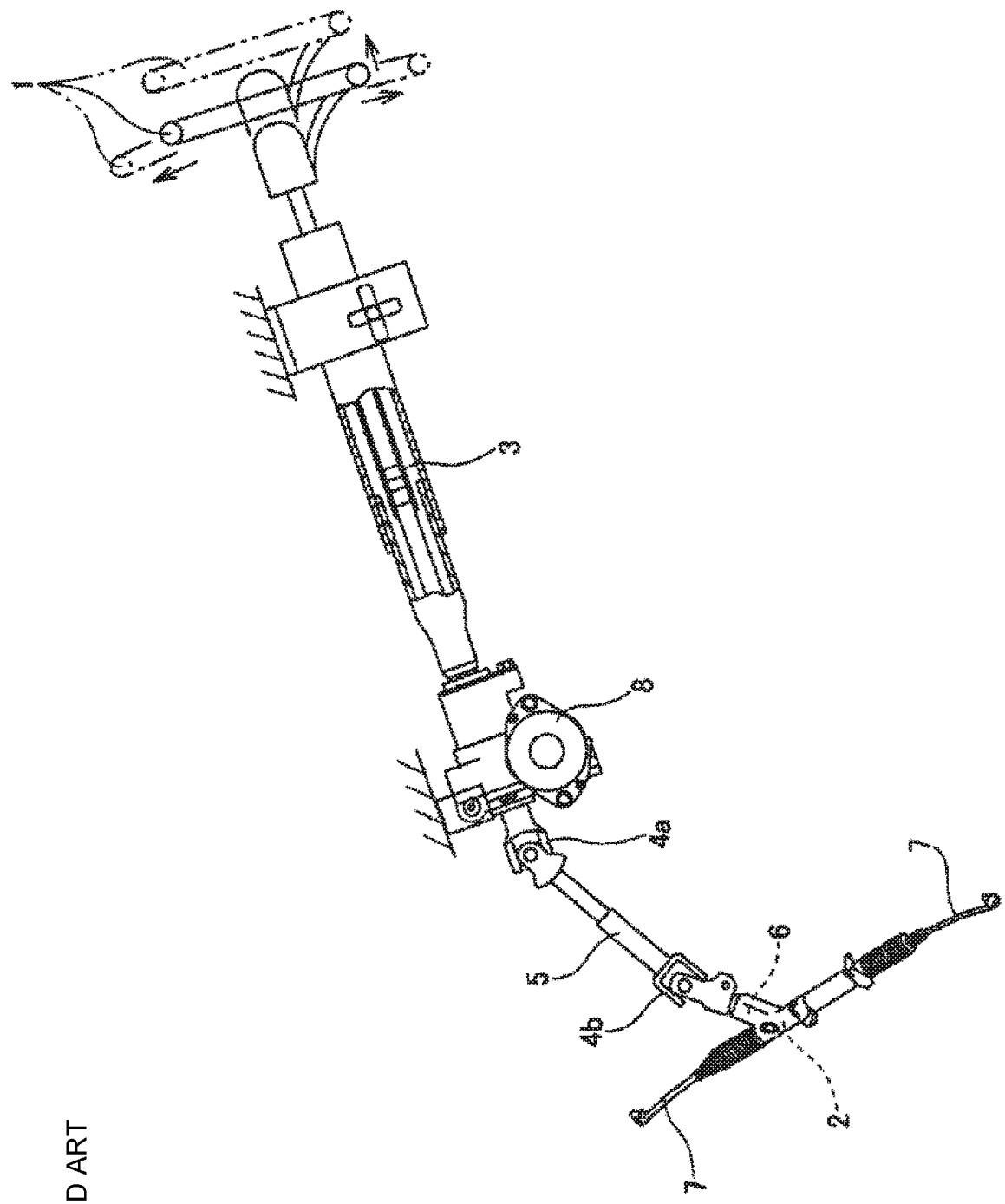
FIG. 7 is a partially longitudinal side view depicting an example of a steering device for an automobile.
Figure 8:
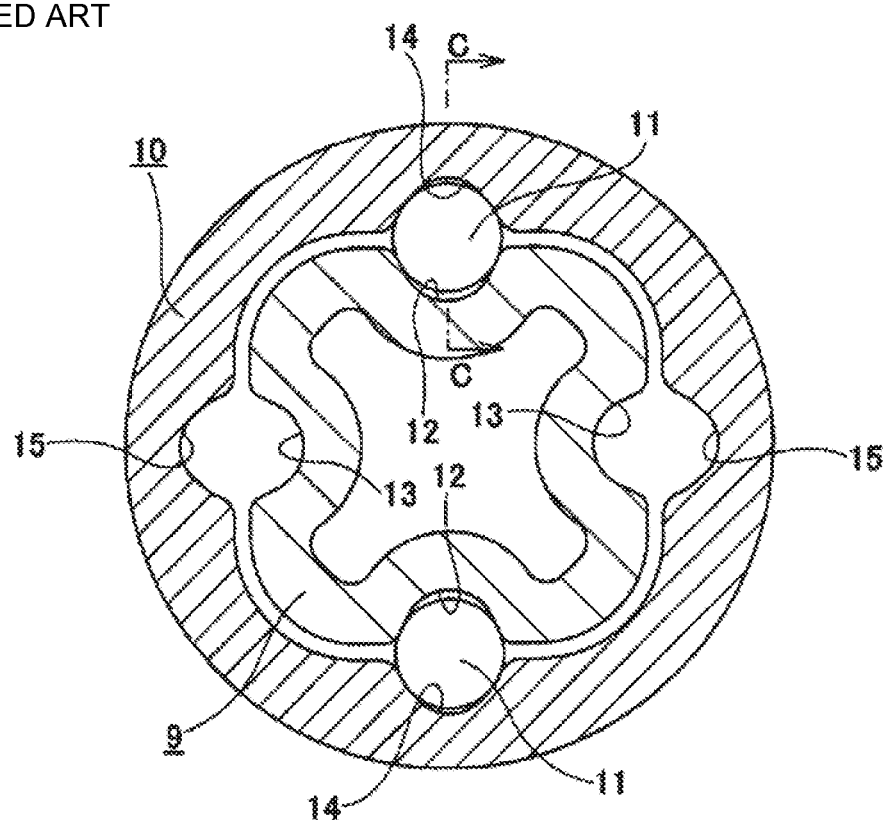
FIG. 8 is a sectional view depicting an example of an extensible rotation transmission shaft of the related art.
Figure 9:
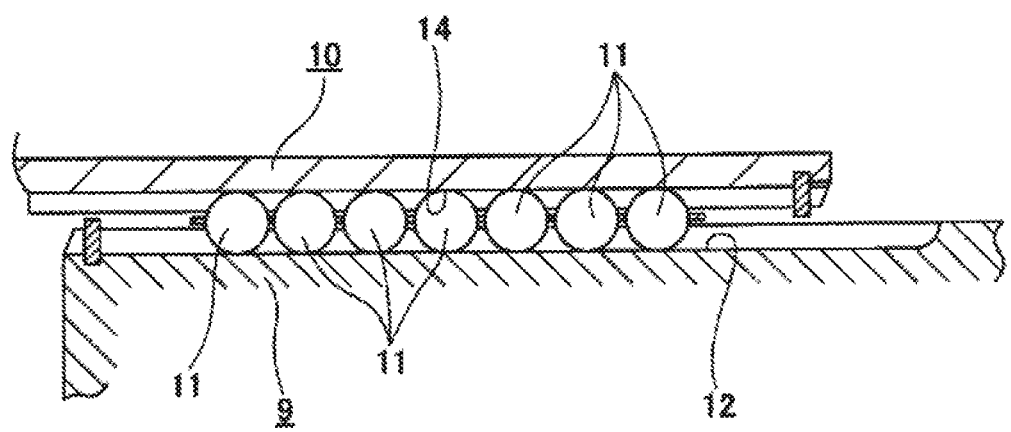
FIG. 9 is a sectional view taken along a line C-C of FIG. 8.
Figure 10:
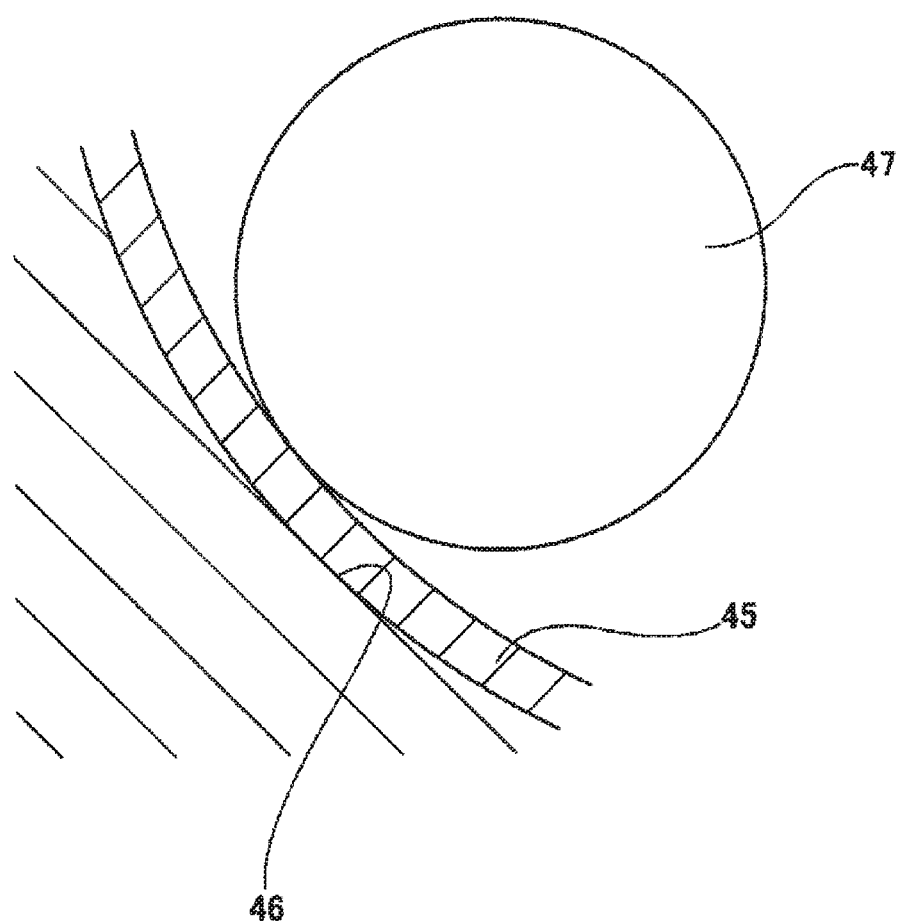
FIG. 10 is a partially sectional view depicting an example a structure where a guide plate is interposed between an inner surface of a concave groove and a rolling surface of a ball.

A first example of an embodiment of the present invention will be described with reference to FIGS. 1 to 4B. In the first example, an extensible rotation transmission shaft 16 (hereinafter, also referred to as "transmission shaft") is used as a variety of shafts required to have both functions of transmission of torque (rotational force) and axial extension and retraction, like the intermediate shaft 5, the steering shaft 3 and the like shown in FIG. 7, for example. For this reason, the transmission shaft 16 includes an inner shaft 9a, an outer shaft 10a and a plurality of balls 11, 11, like the structure shown in FIGS. 8 and 9. Also, the transmission shaft 16 of the first example includes an inner-side guide plate 17 and an outer-side guide plate 18. The inner-side guide plate 17 and the outer-side guide plate 18 correspond to the target guide plate defined in the claims.

The inner shaft 9a has a substantially cylindrical cross shape as a whole, which is a hollow shape, and is made of a metal material such as steel. An outer peripheral surface of the inner shaft 9a is formed with inner-side concave grooves 12a, 12a, which are respectively recessed radially inwards and extend in an axial direction, at two places (diametrically opposite positions) equally spaced in a circumferential direction. Also, the outer peripheral surface of the inner shaft 9a is formed with inner-side preliminary concave grooves 13a, 13a, each of which has the same shape as each of the inner-side concave grooves 12a, 12a, at positions of which phases in the circumferential direction are offset by 90 degrees with respect to the respective inner-side concave grooves 12a, 12a. At an assembled state of the transmission shaft 16, the respective balls 11, 11 are not arranged in the inner-side preliminary concave grooves 13a, 13a.

The inner-side concave grooves 12a, 12a and the inner-side preliminary concave grooves 13a, 13a are formed by plastically deforming an outer peripheral surface of a cylindrical material towards a radially inner side. For this reason, portions of an inner peripheral surface of the inner shaft 9a, which are aligned with the respective inner-side concave grooves 12a, 12a and the respective inner-side preliminary concave grooves 13a, 13a, protrude radially inwards.

Also, a sectional shape of each inner-side concave groove 12a (and each inner-side preliminary concave groove 13a) is a Gothic arch shape where a pair of circular arc-shaped curves of which radii of curvature are greater than a radius of curvature $R_{11}$ of the rolling surface of each ball 11 positioned at both sides of each inner-side concave groove 12a in a width direction (circumferential direction) and are different from each other is made to smoothly continue at a central portion of each inner-side concave groove 12a (and each inner-side preliminary concave groove 13a) in the width direction by a circular arc-shaped curve having a radius of curvature smaller than the radius of curvature $R_{11}$ of the rolling surface of each ball 11.

Also, the inner surface of each inner-side concave groove 12a is formed with inner-side sub-concave grooves 19, 19 (width W) of which a sectional shape of an inner surface is a circular arc, at two places close to both ends in the circumferential direction (two places in the circumferential direction of which phases in the circumferential direction coincide with two inner-side contact portions 28, 28, which will be described later). The inner-side sub-concave grooves 19, 19 are recessed in a normal direction and are formed over an entire length of each inner-side concave groove 12a with axially extending. Also, a radius of curvature $R_{19}$ of the sectional shape of each of the inner-side sub-concave grooves 19, 19 is smaller than a radius of curvature of a sectional shape of portions adjacent to both sides of each of the inner-side sub-concave grooves 19, 19 in the width direction, and is the same as a sum $R_{11}+t$ of the radius of curvature $R_{11}$ of the rolling surface of each ball 11 and a plate thickness t of the inner-side guide plate 17 ($R_{19}=R_{11}+t$) or is slightly greater than the sum $R_{11}+t$ ($R_{19}>R_{11}+t$). Also, continuing portions of the inner surface of each inner-side concave groove 12a between each of the inner-side sub-concave grooves 19, 19 and portions adjacent to both sides of each of the inner-side sub-concave grooves 19, 19 in the width direction are respectively configured as a smooth convex curved surface having a partially cylindrical shape.

The outer shaft 10a has a hollow cylindrical shape, in which the inner shaft 9a can be inserted, and is made of a metal material such as steel. An outer peripheral surface of the outer shaft 10a is formed to have a single cylindrical surface shape. An inner peripheral surface of the outer shaft 10a is formed with concave portions recessed radially outwards at a plurality of places in the circumferential direction.

The inner peripheral surface of the outer shaft 10a is formed with outer-side concave grooves 14a, 14a recessed radially outwards and axially extending at two places in the circumferential direction 2 at which the outer-side concave grooves are aligned with the respective inner-side concave grooves 12a, 12a. Also, the inner peripheral surface of the outer shaft 10a is formed with outer-side preliminary concave grooves 15a, 15a, each of which has the same shape as each of the outer-side concave grooves 14a, 14a, at positions of which phases in the circumferential direction are offset by 45 degrees and 90 degrees with respect to the respective outer-side concave grooves 14a, 14a. At the assembled state of the transmission shaft 16, the respective balls 11, 11 are not arranged in the outer-side preliminary concave grooves 15a, 15a.

The inner peripheral surface of the outer shaft 10a is formed with small concave grooves 21, 21 between each outer-side concave groove 14a and each outer-side preliminary concave groove 15a in the circumferential direction and between the outer-side preliminary concave grooves 15a, 15a adjacent to each other in the circumferential direction. Each of the small concave grooves 21, 21 has a depth in the radial direction and an opening width in the circumferential direction smaller than the outer-side concave groove 14a and the outer-side preliminary concave groove 15a.

In this way, the inner peripheral surface of the outer shaft 10a is formed with the plurality of the outer-side preliminary concave grooves 15a, 15a and the small concave grooves 21, 21, in addition to the outer-side concave grooves 14a, 14a to be originally required, so that the rigidity of the outer shaft 10a in the circumferential direction is lowered and the outer shaft 10a can be thus easily elastically deformed (diameter thereof easily enlarged).

Also, a sectional shape of each outer-side concave groove 14a (and the outer-side preliminary concave groove 15a) is a Gothic arch shape where a pair of circular arc-shaped curves of which radii of curvature are greater than the radius of curvature $R_{11}$ of the rolling surface of each ball 11 positioned at both sides of each outer-side concave groove 14a in the width direction (circumferential direction) and are different from each other is made to smoothly continue at a central portion of each outer-side concave groove 14a (and each outer-side preliminary concave groove 15a) in the width direction by a circular arc-shaped curve having a radius of curvature smaller than the radius of curvature $R_{11}$ of the rolling surface of each ball 11.

Also, the inner surface of each outer-side concave groove 14a is formed with outer-side sub-concave grooves 20, 20 (width W) of which a sectional shape of an inner surface is a circular arc, at two places close to both ends in the circumferential direction (two places in the circumferential direction of which phases in the circumferential direction coincide with two outer-side contact portions 36, 36, which will be described later). The outer-side sub-concave grooves 20, 20 are recessed in a normal direction of each of the places and are formed over an entire length of each outer-side concave groove 14a with axially extending.

Also, a radius of curvature $R_{20}$ of the sectional shape of each of the outer-side sub-concave grooves 20, 20 is smaller than a radius of curvature of a sectional shape of portions adjacent to both sides of each of the outer-side sub-concave grooves 20, 20 in the width direction, and is the same as the sum $R_{11}+t$ of the radius of curvature $R_{11}$ of the rolling surface of each ball 11 and a plate thickness t of the outer-side guide plate 18 ($R_{20}=R_{11}+t$) or is slightly greater than the sum $R_{11}+t$ ($R_{19}>R_{11}+t$). Also, continuing portions of the inner surface of each outer-side concave groove 14a between each of the outer-side sub-concave grooves 20, 20 and portions adjacent to both sides of each of the outer-side sub-concave grooves 20, 20 in the width direction are respectively configured as a smooth convex curved surface having a partially cylindrical shape.

Each of the balls 11, 11 is made of a material such as SUJ2, SUJ3, SCM420H or the like, for example. The respective balls 11, 11 are arranged side by side (in series) axially between the respective inner-side concave grooves 12a, 12a and the respective outer-side concave grooves 14a, 14a. Particularly, in the first example, the respective balls 11, 11 are arranged between the respective inner-side concave grooves 12a, 12a and the respective outer-side concave grooves 14a, 14a with the inner-side guide plate 17 and the outer-side guide plate 18 being interposed therebetween.

The inner-side guide plate 17 is a metal plate such as a stainless steel plate, a spring steel plate or the like. The inner-side guide plate 17 has a substantially semi-cylindrical shape (a substantially C-shaped section) as a whole. Also, the inner-side guide plate 17 has the constant plate thickness t as a whole. The inner-side guide plate 17 has a pair of inner-side guide main body parts 22, 22 provided at both end portions in the circumferential direction and one inner-side coupling part 23 coupling both the inner-side guide main body parts 22, 22.

A sectional shape of the inner-side guide main body part 22 is a Gothic arch shape recessed radially inwards. That is, each inner-side guide main body part 22 has a pair of large-diameter cylindrical portions 24, 24 positioned at both sides in the width direction (circumferential direction) and having different radii of curvature, and a small-diameter cylindrical portion 25 having a radius of curvature smaller than both the large-diameter cylindrical portions 24, 24 and smoothly continuing the large-diameter cylindrical portions at a central portion of each inner-side guide main body part 22 in the width direction.

The inner-side guide plate 17 having the above-described configuration is mounted to the inner shaft 9*a* at a state where the inner-side coupling part 23 is externally fitted to the outer peripheral surface of the inner shaft 9*a* with an interference and the inner-side guide main body parts 22, 22 are respectively engaged in the inner-side concave grooves 12*a*. 12*a* formed on the outer peripheral surface of the inner shaft 9*a*.

The outer-side guide plate 18 is a metal plate such as a stainless steel plate, a spring steel plate or the like, like the inner-side guide plate 17. The outer-side guide plate 18 has a substantially semi-cylindrical shape (a substantially C-shaped section) as a whole. Also, the outer-side guide plate 18 has the constant plate thickness t as a whole, which is the same as that of the inner-side guide plate 17. The outer-side guide plate 18 has a pair of outer-side guide main body parts 26, 26 provided at both end portions in the circumferential direction and one outer-side coupling part 27 coupling both the outer-side guide main body parts 26, 26.

A sectional shape of the outer-side guide main body part 26 is a Gothic arch shape recessed radially inwards. That is, each outer-side guide main body part 26 has a pair of large-diameter cylindrical portions 24*a*. 24*a* positioned at both sides in the width direction (circumferential direction) and having different radii of curvature, and a small-diameter cylindrical portion 25*a* having a radius of curvature smaller than both the large-diameter cylindrical portions 24*a*, 24*a* and smoothly continuing the large-diameter cylindrical portions at a central portion of each outer-side guide main body part 26 in the width direction.

The outer-side guide plate 18 having the above-described configuration is mounted to the outer shaft 10*a* at a state where the outer-side coupling part 27 is internally fitted to the inner peripheral surface of the outer shaft 10*a* with an interference and the outer-side guide main body parts 26, 26 are respectively engaged in the outer-side concave grooves 14*a*, 14*a* formed on the inner peripheral surface of the outer shaft 10*a*.

When assembling the transmission shaft 16, as described above, the inner-side guide plate 17 is mounted (externally fitted) to the inner shaft 9*a* and the outer-side guide plate 18 is mounted (internally fitted) to the outer shaft 10*a*, in advance.

Figure 4A:
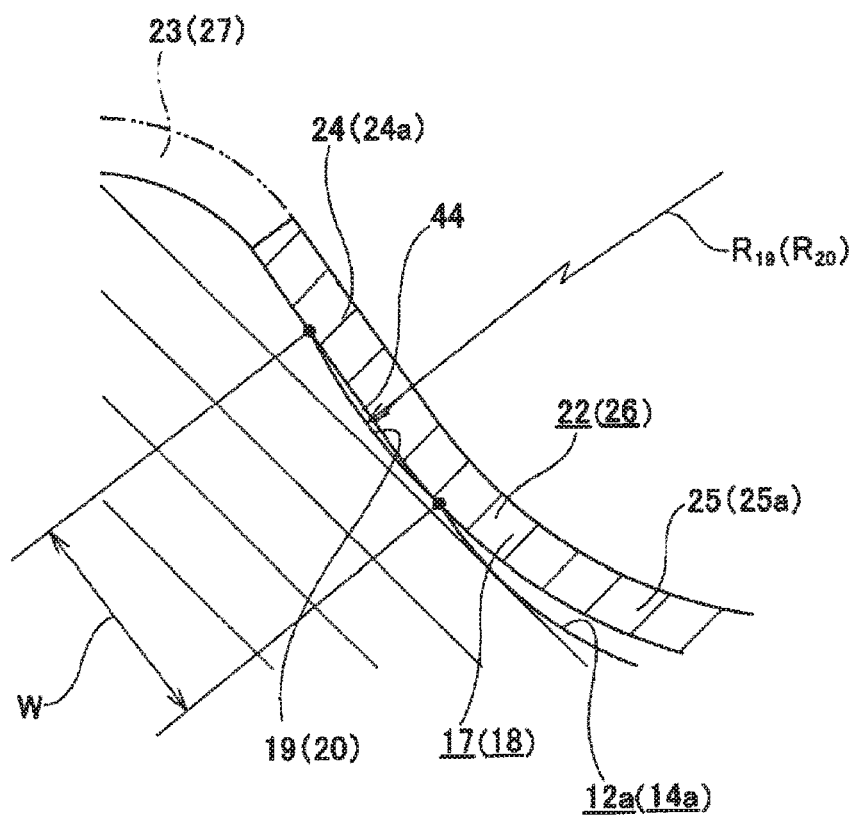
FIG. 4A depicts parts corresponding to respective B parts of FIG. 3 at a state before assembling.

At this state, as shown in FIG. 4A, a radially inner surface (corresponding to the other radial surface of the claims) of a portion (a portion interposed between the rolling surface of each ball 11 and the inner surface of each inner-side sub-concave groove 19 at an assembled state), which faces each inner-side sub-concave groove 19, of each large-diameter cylindrical portion 24 of each inner-side guide main body part 22 of the inner-side guide plate 17 is not contacted to the inner surface of each inner-side sub-concave groove 19. That is, a gap 44 is formed between the radially inner surface, which faces each inner-side sub-concave groove 19, of each large-diameter cylindrical portion 24 and the inner surface of each inner-side sub-concave groove 19.

Likewise, a radially outer surface (corresponding to the other radial surface of the claims) of a portion (a portion interposed between the rolling surface of each ball 11 and the inner surface of each outer-side sub-concave groove 20 at the assembled state), which faces each outer-side sub-concave groove 20, of each large-diameter cylindrical portion 24*a* of each outer-side guide main body part 26 of the outer-side guide plate 18 is not contacted to the inner surface of each outer-side sub-concave groove 20. That is, a gap 44 is formed between the radially outer surface, which faces each outer-side sub-concave groove 20, of each large-diameter cylindrical portion 24*a* and the inner surface of each outer-side sub-concave groove 20.

Figure 1:
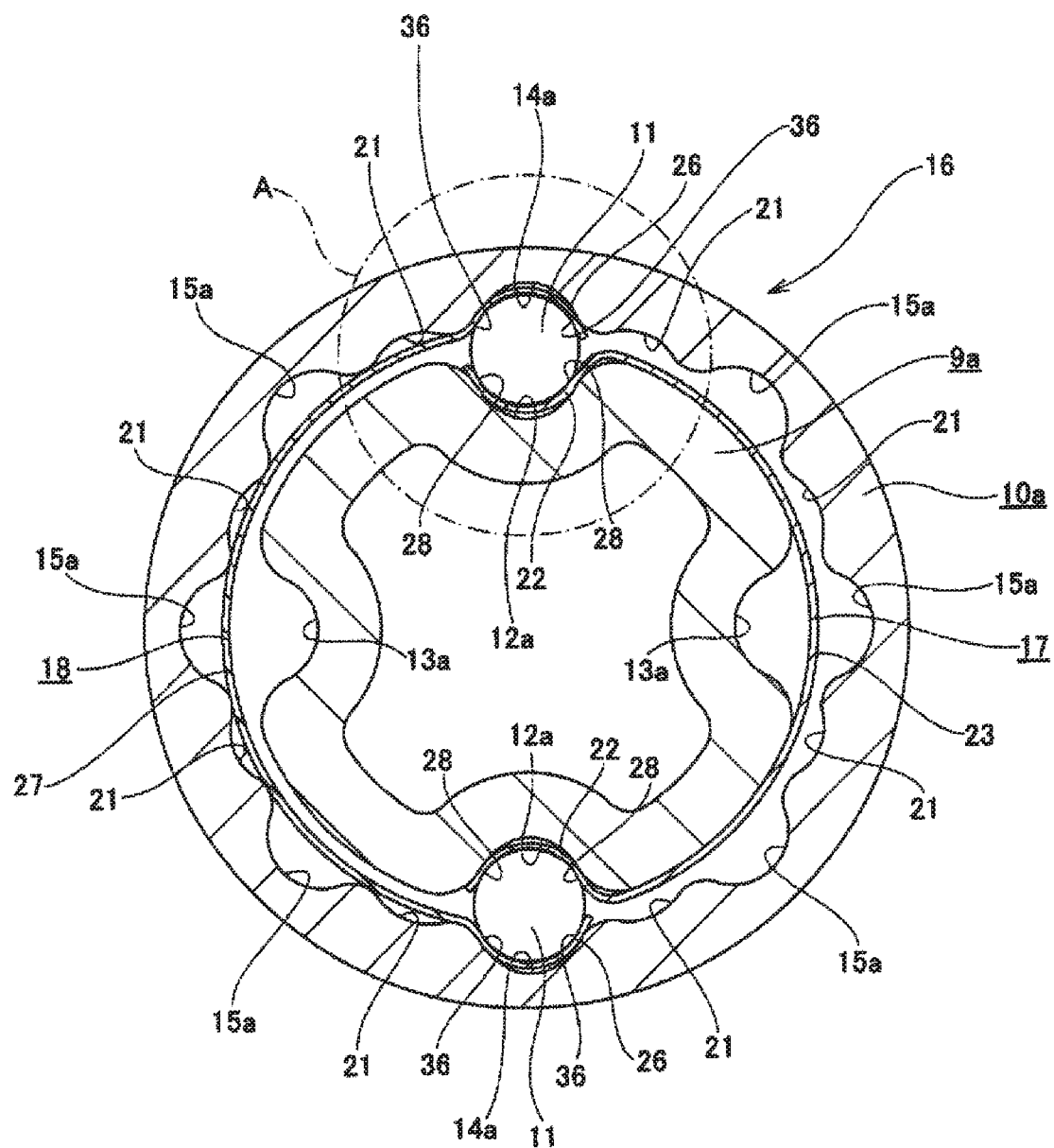
FIG. 1 is a sectional view of an extensible rotation transmission shaft in accordance with a first example of an embodiment.
Figure 2:
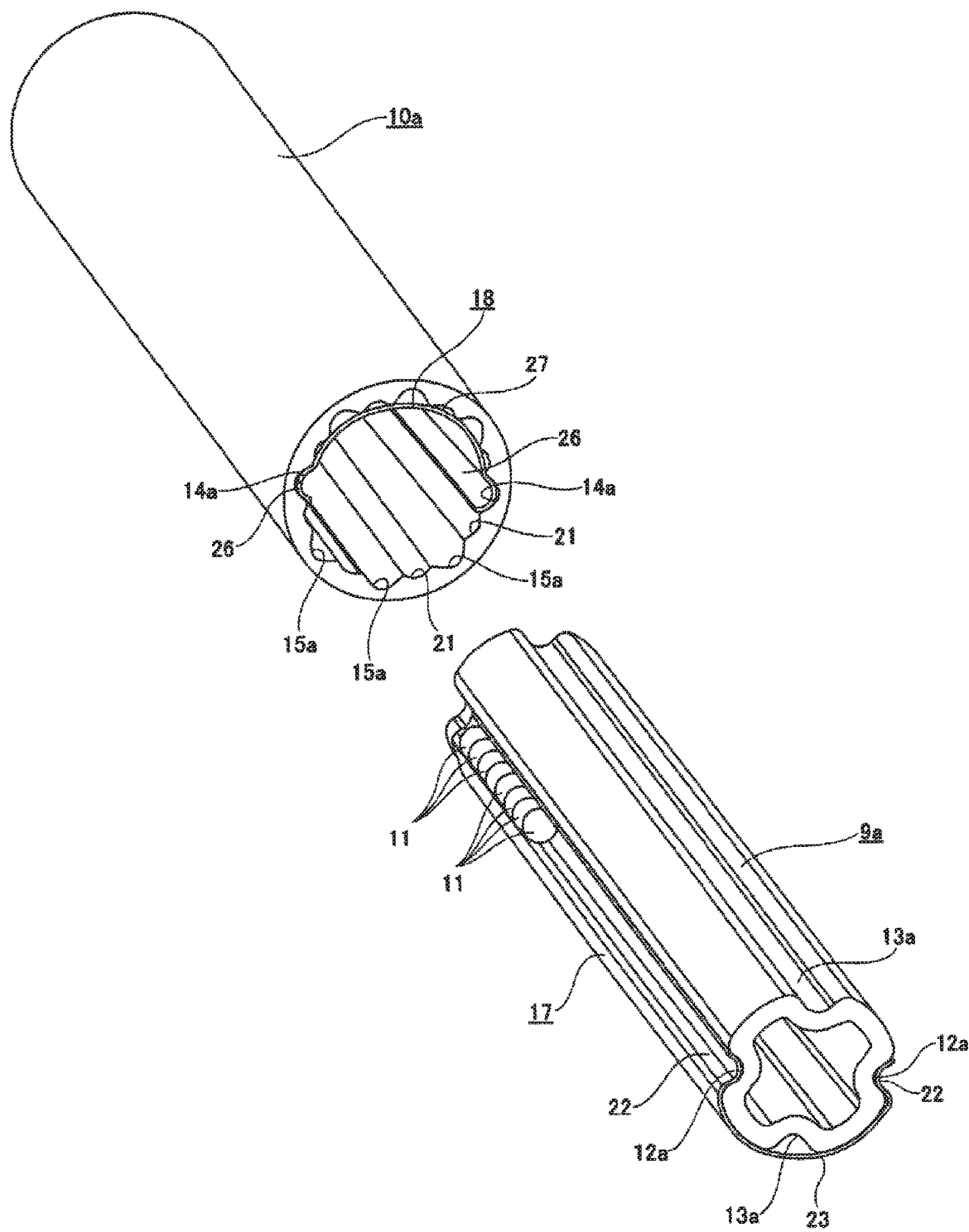
FIG. 2 is an exploded perspective view of the extensible rotation transmission shaft of the first example of the embodiment.
Figure 3:
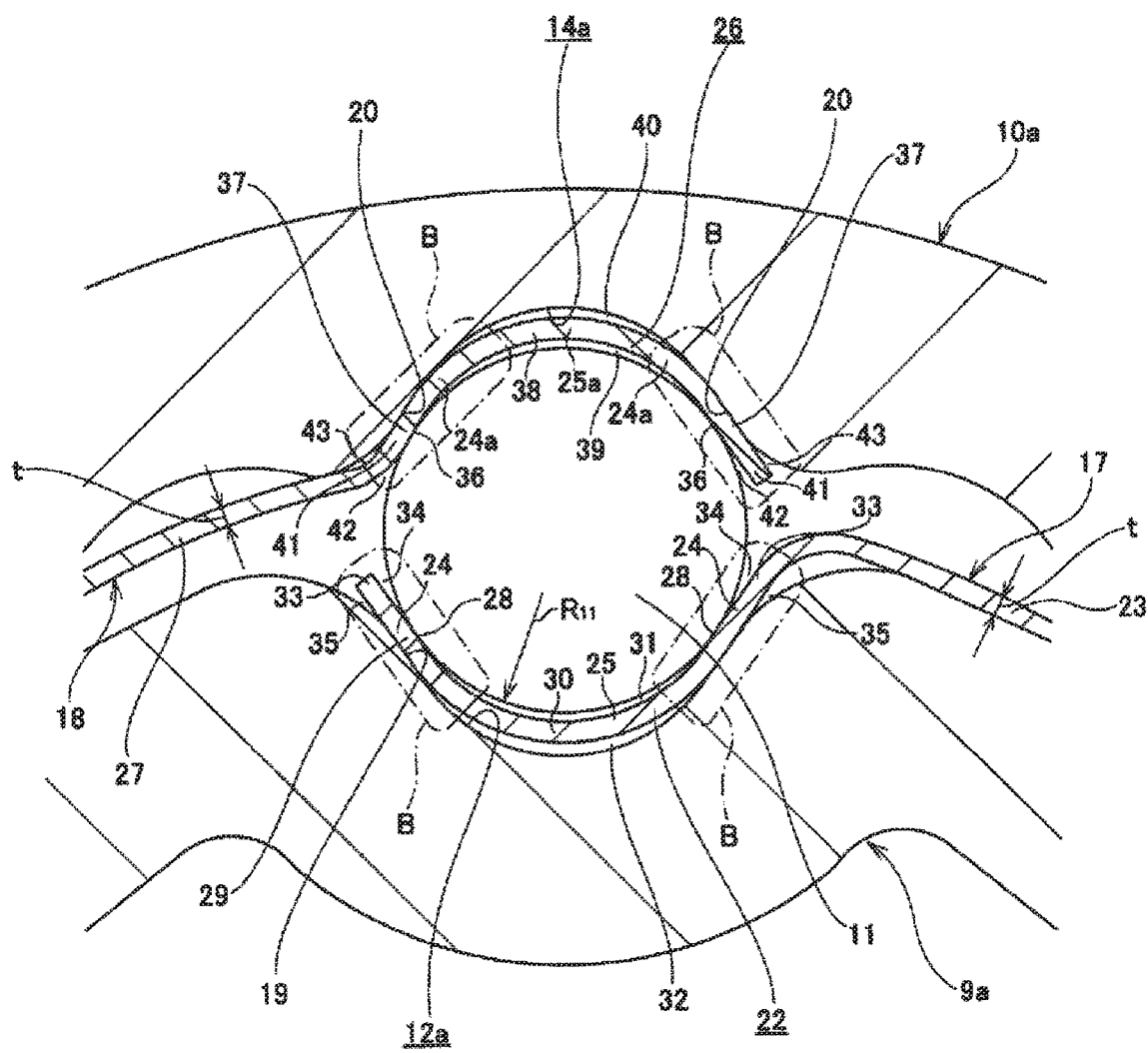
FIG. 3 is an enlarged view of an A part of FIG. 1.

At this state, as shown in FIG. 2, the inner shaft 9*a* is inserted into the outer shaft 10*a* so that the plurality of balls 11, 11 is interposed with being axially aligned between the inner-side guide main body parts 22, 22 of the inner-side guide plate 17 and the outer-side guide main body parts 26, 26 of the outer-side guide plate 18.

Figure 4B:
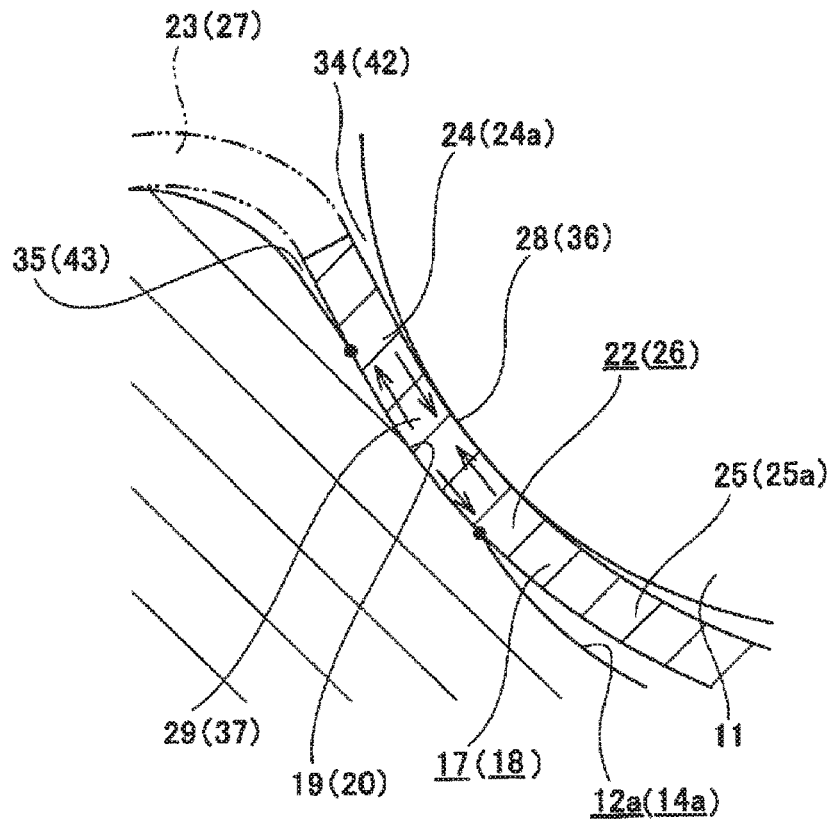
FIG. 4B depicts the parts corresponding to respective B parts of FIG. 3 at a state after the assembling.

As the insertion operation proceeds, as shown in FIG. 4B, the portion, which is interposed between the rolling surface of each ball 11 and the inner surface of each inner-side sub-concave groove 19, of each large-diameter cylindrical portion 24 of each inner-side guide main body part 22 becomes an inner-side curved portion 29 of which a radially inner surface is pressed by the inner surface of each inner-side sub-concave groove 19 with a radially outer surface (corresponding to one radial surface of the claims) being pressed and elastically or plastically curved by the rolling surface of each ball 11.

Likewise, the portion, which is interposed between the rolling surface of each ball 11 and the inner surface of each outer-side sub-concave groove 20, of each large-diameter cylindrical portion 24*a* of each outer-side guide main body part 26 becomes an outer-side curved portion 37 of which a radially outer surface is pressed by the inner surface of each outer-side sub-concave groove 20 with a radially inner surface (corresponding to one radial surface of the claims) being pressed and elastically or plastically curved by the rolling surface of each ball 11.

In this way, as the radially inner surface of each inner-side curved portion 29 is pressed by the inner surface of each inner-side sub-concave groove 19, the inner surface of each of the inner-side concave grooves 12*a*, 12*a* and at least a surrounding part of each inner surface of the inner shaft 9*a* are elastically deformed more radially inwards than the state before the assembling. Also, as the radially outer surface of each outer-side curved portion 37 is pressed by the inner surface of each outer-side sub-concave groove 20, the inner surface of each of the outer-side concave grooves 14*a*, 14*a* and at least a surrounding part of each inner surface of the outer shaft 10*a* are elastically deformed more radially outwards than the state before the assembling. By the elastic deformations of the inner shaft 9*a* and the outer shaft 10*a*, preload is applied to each ball 11.

In the meantime, even when each inner-side curved portion 29 and each outer-side curved portion 37 are elastically curved, an amount of the curving and a generated elastic force are not very high. For this reason, in the first example, even when each inner-side curved portion 29 and each outer-side curved portion 37 are elastically curved, each ball 11 is applied with the preload by the elastic deformations of the inner shaft 9*a* and the outer shaft 10*a* as described above. That is, each ball 11 is applied with the preload, irrespective of the elastic forces of the inner-side guide plate 17 and the outer-side guide plate 18 (at a state where a ratio of preload to be applied by the elastic forces is substantially zero).

In the meantime, FIG. 4B depicts a state where the outer surface of each inner-side curved portion 29 (outer-side curved portion 37) is contacted to the inner surface of each inner-side sub-concave groove 19 (outer-side sub-concave groove 20) without a gap. However, a slight gap may be formed between the inner surface of each inner-side sub-concave groove 19 (outer-side sub-concave groove 20) and the outer surface of each inner-side curved portion 29 (outer-side curved portion 37), due to a processing error or the like of each inner-side sub-concave groove 19 (outer-side sub-concave groove 20).

Also, after assembling the transmission shaft 16, as described above, at a state where the rotational force is not transmitted between the inner shaft 9*a* and the outer shaft 10*a*, the rolling surface of each ball 11 and the radially outer surface of each inner-side guide main body part 22 are contacted to each other only at inner-side contact portions 28, 28 positioned at the portions (the radially outer surfaces-side of the respective inner-side curved portions 29) at which the rolling surface and the radially outer surface are aligned with the respective inner-side sub-concave grooves 19, 19 at two places spaced in the circumferential direction. Also, only the portions (rear portions in the plate thickness direction, the radially inner surfaces of the respective inner-side curved portions 29), which are aligned with the respective inner-side contact portions 28, 28, of the radially inner surface of each of the inner-side guide main body parts 22 are supported by the inner surface of the inner-side concave groove 12*a* (the inner surfaces of the respective inner-side sub-concave grooves 19, 19). In other words, a shape and a size of each inner-side guide main body part 22 at a free state are set so that the corresponding states are made.

For this reason, a first inner-side non-contact portion 30 of which a radially outer surface is not contacted to the rolling surface of each ball 11 and a radially inner surface is also not contacted to the inner surface of each inner-side concave groove 12*a* is provided between the two inner-side contact portions 28, 28 (inner-side curved portions 29, 29) of each inner-side guide main body part 22. A first inner-side gap 31 having a substantial crescent shape is formed between the radially outer surface of the first inner-side non-contact portion 30 and the rolling surface of each ball 11. A second inner-side gap 32 having a substantial crescent shape is formed between the radially inner surface of the first inner-side non-contact portion 30 and the inner surface of each inner-side concave groove 12*a*.

Also, both sides (outer sides) of the two inner-side contact portions 28, 28 (inner-side curved portions 29, 29) of each inner-side guide main body part 22 in the circumferential direction are provided with a pair of second inner-side non-contact portions 33, 33 of which a radially outer surface is not contacted to the rolling surface of each ball 11 and a radially inner surface is also not contacted to the inner surface of the inner-side concave groove 12*a*. Third inner-side gaps 34, 34 having a substantial wedge shape are respectively formed between the radially outer surfaces of the respective second inner-side non-contact portions 33, 33 and the rolling surface of each ball 11. Fourth inner-side gaps 35, 35 having a substantial wedge shape are respectively formed between the radially inner surfaces of the respective second inner-side non-contact portions 33, 33 and the inner surface of each inner-side concave groove 12*a*.

In contrast, the rolling surface of each ball 11 and the radially inner surface of the outer-side guide main body part 26 configuring the outer-side guide plate 18 are contacted to each other only at outer-side contact portions 36, 36 positioned at the portions (the radially outer surfaces-side of the respective outer-side curved portions 37) at which the rolling surface and the radially inner surface are aligned with the respective outer-side sub-concave grooves 20, 20 at two places spaced in the circumferential direction. Also, only the portions (rear portions in the plate thickness direction, the radially outer surfaces of the respective outer-side curved portions 37), which are aligned with the respective outer-side contact portions 36, 36, of the radially outer surface of each of the outer-side guide main body parts 26 are supported by the inner surface of the outer-side concave groove 14*a* (the inner surfaces of the respective outer-side sub-concave grooves 20, 20). In other words, a shape and a size of each outer-side guide main body part 26 at a free state are set so that the corresponding states are made.

For this reason, a first outer-side non-contact portion 38 of which a radially inner surface is not contacted to the rolling surface of each ball 11 and a radially outer surface is also not contacted to the inner surface of each outer-side concave groove 14*a* is provided between the two outer-side contact portions 36, 36 (outer-side curved portions 37, 37) of each outer-side guide main body part 26. A first outer-side gap 39 having a substantial crescent shape is formed between the radially inner surface of the first outer-side non-contact portion 38 and the rolling surface of each ball 11. A second outer-side gap 40 having a substantial crescent shape is formed between the radially outer surface of the first outer-side non-contact portion 38 and the inner surface of each outer-side concave groove 14*a*.

Also, both sides (outer sides) of the two outer-side contact portions 36, 36 (outer-side curved portions 37, 37) of each outer-side guide main body part 26 in the circumferential direction are provided with a pair of second outer-side non-contact portions 41, 41 of which a radially inner surface is not contacted to the rolling surface of each ball 11 and a radially outer surface is also not contacted to the inner surface of the outer-side concave groove 14*a*. Third outer-side gaps 42, 42 having a substantial wedge shape are respectively formed between the radially inner surfaces of the respective second outer-side non-contact portions 41, 41 and the rolling surface of each ball 11. Fourth outer-side gaps 43, 43 having a substantial wedge shape are respectively formed between the radially outer surfaces of the respective second outer-side non-contact portions 41, 41 and the inner surface of each outer-side concave groove 14*a*.

As described above, the transmission shaft 16 of the first example is configured by combining the inner shaft 9*a* and the outer shaft 10*a* via each of the balls 11, 11, the inner-side guide plate 17 and the outer-side guide plate 18 so that the rotational force can be transmitted and the axial relative displacement can be enabled therebetween. According to the transmission shaft 16 of the first example having the above-described configuration, it is possible to implement a structure capable of suppressing the rattling while preventing damages of the inner-side guide plate 17 and the outer-side guide plate 18 and the wears of the respective parts.

That is, according to the first example, the preload is not substantially applied to each of the balls 11, 11 by the elastic forces of the inner-side guide plate 17 and the outer-side guide plate 18, and the preload is applied to each of the balls 11, 11 by using the elastic deformations of the inner shaft 9*a* and the outer shaft 10*a*, so that the rattling of the transmission shaft 16 is suppressed. For this reason, it is possible to implement a structure capable of suppressing the rattling of the transmission shaft 16 without causing the high bending deformation in the inner-side guide plate 17 and the outer-side guide plate 18 at the state after the transmission shaft 16 is assembled.

Also, according to the first example, the portions (the radially inner surfaces of the respective inner-side curved portions 29, 29), which are positioned at the rear of the inner-side contact portions 28, 28 in contact with the rolling surface of each ball 11, of the inner-side guide plate 17 are supported by the inner surfaces of the respective inner-side sub-concave grooves 19, 19 of the inner-side concave groove 12a. Also, the portions (the radially outer surfaces of the respective outer-side curved portions 37, 37), which are positioned at the rear of the outer-side contact portions 36, 36 in contact with the rolling surface of each ball 11, of the outer-side guide plate 18 are supported by the inner surfaces of the respective outer-side sub-concave grooves 20, 20 of the outer-side concave groove 14a. For this reason, when transmitting the rotational force between the inner shaft 9a and the outer shaft 10a, the portions in contact with the rolling surface of each ball 11 are four places of the inner-side contact portions 28, 28 and the outer-side contact portions 36, 36 or three or two places thereof (one place of the inner-side contact portion and one place of the outer-side contact portion). However, in any case, it is possible to prevent the high bending deformation from being caused in both the inner-side and outer-side guide plates 17, 18.

Also, according to the first example, as described above, at the assembled state and upon the transmission of the rotational force, it is possible to prevent the high bending deformation from being caused in both the inner-side and outer-side guide plates 17, 18. Therefore, even when both the inner-side and outer-side guide plates 17, 18 and the outer peripheral surface of the inner shaft 9a or the inner peripheral surface of the outer shaft 10a are contacted, it is possible to prevent the wears from being caused at the contact portions.

Also, according to the first example, the portion of the inner-side guide plate 17 interposed between the rolling surface of each ball 11 and the inner surface of each of the inner-side sub-concave grooves 19, 19 is the inner-side curved portion 29 of which the radially outer surface is pressed and is thus elastically or plastically curved by the rolling surface of each ball 11. Also, the portion of the outer-side guide plate 18 interposed between the rolling surface of each ball 11 and the inner surface of each of the outer-side sub-concave grooves 20, 20 is the outer-side curved portion 37 of which the radially inner surface is pressed and is thus elastically or plastically curved by the rolling surface of each ball 11. For this reason, as the portions of the guide plates are curved, the contacts areas of the inner-side contact portions 28, 28, which are the contact portions between the rolling surface of each of the balls 11, 11 and the radially outer surface of the inner-side guide plate 17, and the contact areas of the outer-side contact portions 36, 36, which are the contact portions between the rolling surface of each of the balls 11, 11 and the radially inner surface of the outer-side guide plate 18 can be respectively increased, and the surface pressure to be applied to each of the inner-side contact portions 28, 28 and each of the outer-side contact portions 36, 36 can be suppressed. Also, compressive stress associated with the curving is applied to the portions (the radially outer surface of each inner-side curved portion 29 and the radially inner surface of each outer-side curved portion 37), which correspond to each of the inner-side contact portions 28, 28 and each of the outer-side contact portions 36, 36, of the radially outer surface of the inner-side guide plate 17 and the radially inner surface of the outer-side guide plate 18. Therefore, it is possible to increase the strength of the respective portions.

As a result, according to the transmission shaft 16 of the first example, it is possible to implement the structure capable of suppressing the rattling while preventing the damages of the inner-side guide plate 17 and the outer-side guide plate 18 and the wears of the respective portions.

Also, according to the method of manufacturing the transmission shaft 16 of the first example, when assembling the transmission shaft 16, while forming the inner-side curved portions 29, 29 and the outer-side curved portions 37, 37 for bringing the rolling surface of each of the balls 11, 11 into contact with the inner-side guide plate 17 and the outer-side guide plate 18, it is possible to introduce parts of the respective inner-side curved portions 29, 29 into the respective inner-side sub-concave grooves 19, 19 and parts of the outer-side curved portions 37, 37 into the respective outer-side sub-concave grooves 20, 20. For this reason, it is possible to easily perform the operation of introducing the parts of the respective curved portions 29, 37 into the respective sub-concave grooves 19, 20, irrespective of the manufacturing errors of the respective components.

On the other hand, unlike the first example, if the transmission shaft 16 is assembled (the insertion operation shown in FIG. 2) at a state where the inner-side guide plate 17 (outer-side guide plate 18) are beforehand formed with the respective inner-side curved portions 29, 29 (the respective outer-side curved portions 37, 37), it may not be possible to perform the insertion operation when phases (positions) are offset in the circumferential direction between the respective inner-side curved portions 29, 29 (the respective outer-side curved portions 37, 37) and the respective inner-side sub-concave grooves 19, 19 (the respective outer-side sub-concave grooves 20, 20), due to the manufacturing errors of the respective components. However, according to the first example, it is possible to avoid the problem upon the assembling.

Also, the thickness of each of the inner-side guide plate 17 and the outer-side guide plate 18 is sufficiently smaller (the rigidity is sufficiently lower) than the inner shaft 9a and the outer shaft 10a. For this reason, before assembling the transmission shaft 16, if a configuration of forming the inner-side guide plate 17 and the outer-side guide plate 18 with concave groove shapes for increasing the contact areas of the inner-side contact portions 28 and the outer-side contact portions 36 is adopted, the bending is likely to be caused in the inner-side guide plate 17 and the outer-side guide plate 18 when measuring sizes of the concave groove shapes during the manufacturing process. Therefore, it is difficult to precisely measure the sizes, which increases the managing cost.

In contrast, according to the first example, when assembling the transmission shaft 16 (simultaneously with the assembling) by using the inner-side sub-concave grooves 19 and the outer-side sub-concave grooves 20 formed at the inner shaft 9a and the outer shaft 10a, the shapes (the inner-side curved portions 29 and the outer-side curved portions 37) for increasing the contact areas of the inner-side contact portions 28 and the outer-side contact portions 36 are formed. Since the rigidity of the inner shaft 9a and the outer shaft 10a is sufficiently higher than the inner-side guide plate 17 and the outer-side guide plate 18, the bending is difficult to be caused in the inner shaft 9a and the outer shaft 10a even when measuring sizes of the shapes (the inner-side curved portions 29 and the outer-side curved portions 37)

during the manufacturing process. Therefore, it is possible to easily measure the sizes, so that it is possible to save the managing cost.

In the meantime, when implementing the structure of the first example, the radius of curvature $R_{19}$ ($R_{20}$) of the sectional shape of each of the inner-side sub-concave grooves 19, 19 (each of the outer-side sub-concave grooves 20, 20) is preferably set to be slightly greater than the sum $R_{11}+t$ of the radius of curvature $R_{11}$ of the rolling surface of each ball 11 and the plate thickness t of the inner-side guide plate 17 (outer-side guide plate 18) ($R_{19}$ ($R_{20}$)>$R_{11}+t$). The reason is described. For example, during the using, even when the position of each of the inner-side curved portions 29, 29 (each of the outer-side curved portions 37, 37) in the circumferential direction is offset with respect to each of the inner-side sub-concave grooves 19, 19 (each of the outer-side sub-concave grooves 20, 20), it is possible to avoid a problem that the radially inner surface (radially outer surface) of each of the inner-side curved portions 29, 29 (each of the outer-side curved portions 37, 37) is to strongly contact end edge portions of each of the inner-side sub-concave grooves 19, 19 (each of the outer-side sub-concave grooves 20, 20) in the width direction.

Also, when implementing the present invention, a configuration where a plurality of balls is arranged side by side in the axial direction between the inner-side preliminary concave groove 13a and the outer-side preliminary concave groove 15a facing each other in the radial direction via the inner-side guide plate main body part of the inner-side guide plate and the outer-side guide plate main body part of the outer-side guide plate.

Second Example of Embodiment

Figure 5:
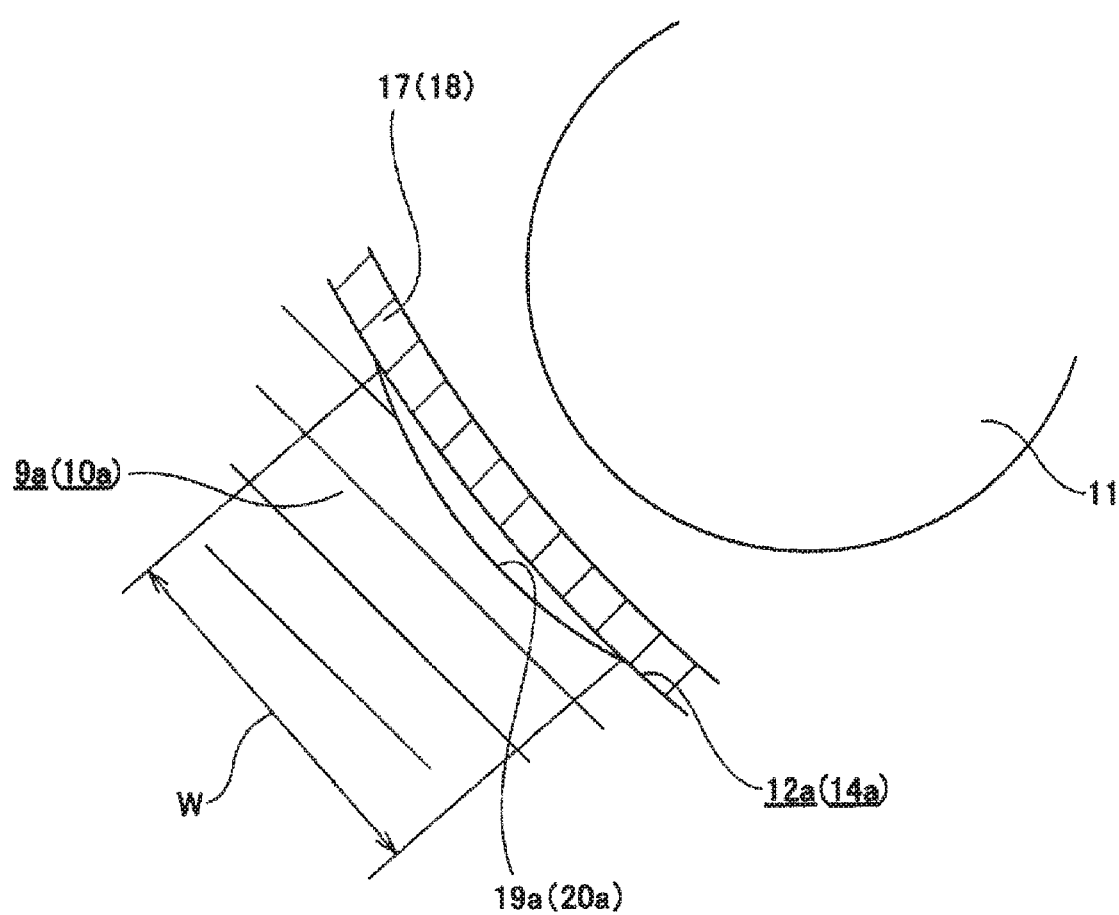
FIG. 5 is a view similar to FIG. 4A, depicting a second example of the embodiment.

A second example of the embodiment of the present invention is described with reference to FIG. 5.

In the second example, a width W of each of an inner-side sub-concave groove 19a and an outer-side sub-concave groove 20a is greater than the first example of the embodiment. Thereby, when transmitting the torque (up to maximum torque when used) between the inner shaft 9a and the outer shaft 10a, even though the ball 11 moves in the circumferential direction along the inner surfaces of the inner-side concave groove 12a and the outer-side concave groove 14a, it is possible to cover the moving range in the circumferential direction by the inner-side sub-concave groove 19a and the outer-side sub-concave groove 20a.

The other configurations and operations are the same as the first example of the embodiment.

Third Example of Embodiment

A third example of the embodiment of the present invention is described with reference to FIG. 6.

Figure 6A:
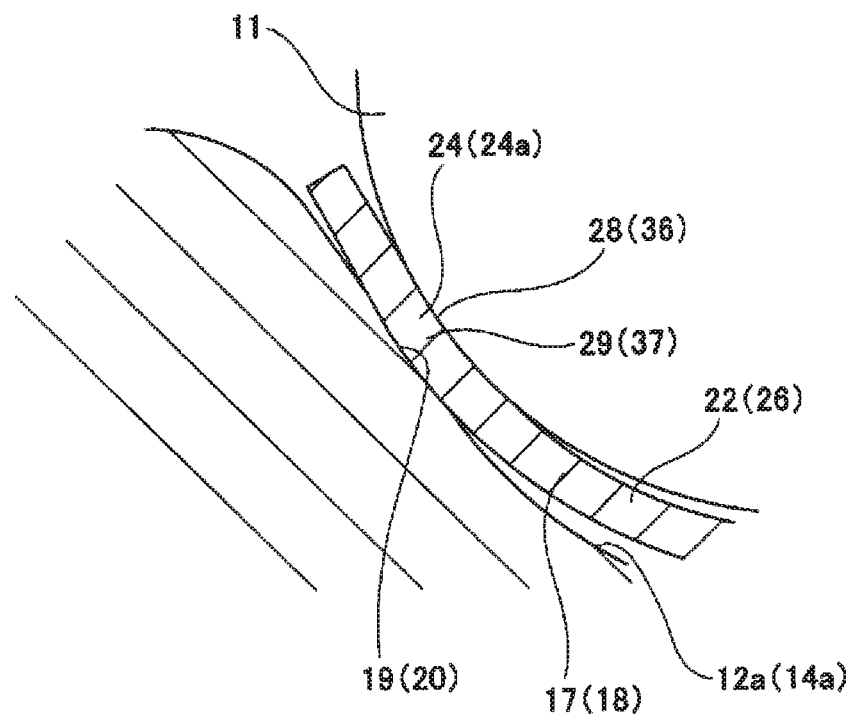
FIG. 6A depicts the parts corresponding to respective B parts of FIG. 3 at a state where a sub-concave groove is processed, in a third example of the embodiment.

In the third example, the inner surfaces of the inner-side concave groove 12a and the outer-side concave groove 14a are respectively formed with the inner-side sub-concave groove 19 and the outer-side sub-concave groove 20 by using the rolling surface of each ball 11. More specifically, as shown in FIG. 6A, the inner surfaces of the inner-side concave groove 12a and the outer-side concave groove 14a of which a sectional shape is a Gothic arch shape are pressed at two places close to both ends in the circumferential direction by the rolling surface of each ball 11 via (the large-diameter cylindrical portion 24 configuring) the inner-side guide plate 17 and (the large-diameter cylindrical portion 24a configuring) the outer-side guide plate 18. Thereby, the inner surfaces of the inner-side concave groove 12a and the outer-side concave groove 14a are respectively plastically deformed at the two places close to both ends in the circumferential direction (indentations are formed). As a result, the inner surface of the inner-side concave groove 12a is formed with the inner-side sub-concave groove 19, and the inner surface of the outer-side concave groove 14a is formed with the outer-side sub-concave groove 20.

Also, as a specific method for forming the inner-side sub-concave groove 19 and the outer-side sub-concave groove 20, a variety of methods can be adopted. For example, a method of, when assembling the transmission shaft 16, forming the inner-side sub-concave groove 19 and the outer-side sub-concave groove 20 continuing in the axial direction by inserting the inner shaft 9a into the outer shaft 10a (relatively displacing the outer shaft 10a and the inner shaft 9a in the axial direction) to plastically deform the inner surfaces of the inner-side concave groove 12a and the outer-side concave groove 14a by the rolling surface of each ball 11, as shown in FIG. 2, can be adopted. When this method is adopted, since it is not necessary to perform a special process for forming the inner-side sub-concave groove 19 and the outer-side sub-concave groove 20 before performing the assembling operation, it is advantageous to save the processing cost.

Also, a method of forming the inner-side sub-concave groove 19 and the outer-side sub-concave groove 20 by relatively displacing the outer shaft 10a and the inner shaft 9a in the axial direction upon a mounting operation of mounting the transmission shaft 16 to a vehicle, for example, can be adopted. Also, a method of, after mounting transmission shaft 16 to a vehicle, forming the inner-side sub-concave groove 19 and the outer-side sub-concave groove 20 by using the axial relative displacement between the outer shaft 10a and the inner shaft 9a, which is to occur as the vehicle travels, can be adopted. Also, a method of, before mounting the transmission shaft 16 to a vehicle, forming the inner-side sub-concave groove 19 and the outer-side sub-concave groove 20 by transmitting torque between the inner shaft 9a and the outer shaft 10a with the inner shaft 9a being inserted into the outer shaft 10a can be adopted. Also, a method of forming the inner-side sub-concave groove 19 and the outer-side sub-concave groove 20 when transmitting torque between the inner shaft 9a and the outer shaft 10a as the steering wheel is rotated after mounting the transmission shaft 16 to a vehicle can be adopted. Also, a method of forming the inner-side sub-concave groove 19 and the outer-side sub-concave groove 20 by relatively displacing (inclining, bending) the inner shaft 9a and the outer shaft 10a so that central axes thereof are mismatched, with the inner shaft 9a being inserted into the outer shaft 10a, can be adopted.

As the method for forming the inner-side sub-concave groove 19 and the outer-side sub-concave groove 20, all of the above-described methods can be adopted. However, when the method of forming the same after mounting the transmission shaft 16 to the vehicle (the method of forming the same in an ex-post or additional manner as the vehicle travels or the steering wheel is operated) is adopted, since it is not necessary to perform a special process for forming the inner-side sub-concave groove 19 and the outer-side sub-concave groove 20, it is advantageous to save the processing cost.

Figure 6B:
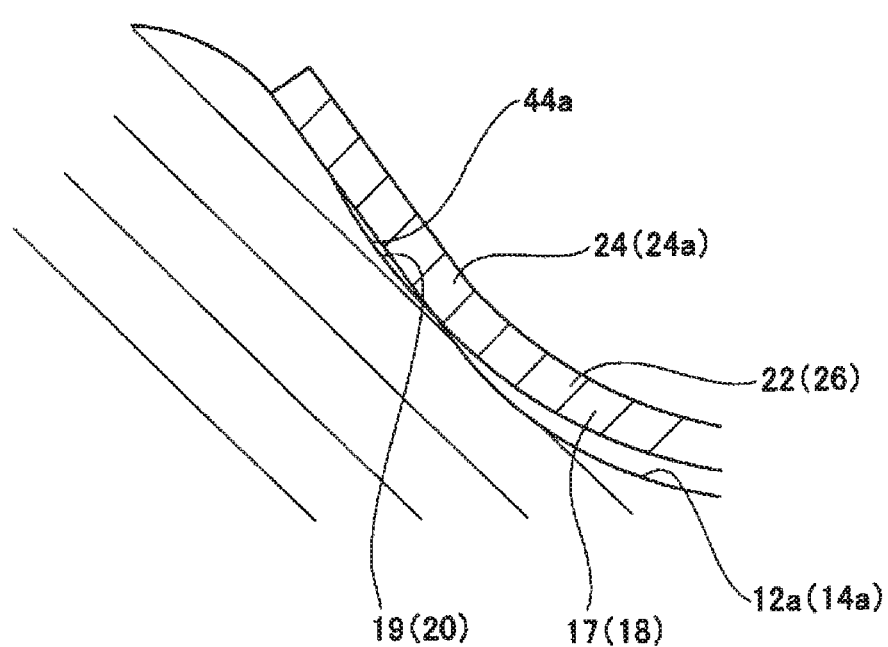
FIG. 6B depicts the parts corresponding to respective B parts of FIG. 3 at a state where a ball is axially moved from a position at which the sub-concave groove is formed, in the third example of the embodiment.

Also, as described above, when forming the inner-side sub-concave groove 19 and the outer-side sub-concave groove 20, the portions (parts of the large-diameter cylindrical portions 24, 24a) of the inner-side guide plate 17 and the outer-side guide plate 18, which are respectively interposed between the rolling surface of each ball 11 and the inner surface of the inner-side concave groove 12a and between the rolling surface of each ball 11 and the inner surface of the outer-side concave groove 14a, are elastically deformed (or plastically deformed) into a circular arc section in conformity to the rolling surface of each ball 11. For this reason, as shown in FIG. 6B, it is possible to elastically restore the inner-side guide plate 17 and the outer-side guide plate 18 at portions to which each ball 11 is axially moved from the formation positions of the inner-side sub-concave groove 19 and the outer-side sub-concave groove 20. In this case, a gap 44a can be provided between the radially inner surface of the large-diameter cylindrical portion 24 of the inner-side guide plate 17 and the inner surface of each inner-side sub-concave groove 19. Also, the gap 44a can be provided between the radially outer surface of the large-diameter cylindrical portion 24a of the outer-side guide plate 18 and the inner surface of each outer-side sub-concave groove 20.

Also, when implementing the third example, the materials of the inner shaft 9a, the outer shaft 10a, each ball 11, the inner-side guide plate 17 and the outer-side guide plate 18 are appropriately selected on the basis of the hardness, so that the hardness of the inner shaft 9a and the outer shaft 10a (the surface hardness of the inner surfaces of at least the inner-side concave groove 12a and the outer-side concave groove 14a) is restricted to be lower than the hardness of each ball 11 and the hardness of the inner-side guide plate 17 and outer-side guide plate 18. Thereby, it is possible to prevent the indentation from being formed on each ball 11 and the inner-side guide plate 17 and outer-side guide plate 18 and to easily form the inner-side sub-concave groove 19 and the outer-side sub-concave groove 20 with the low force.

In the third example of implementing the above-described manufacturing method, it is possible to easily perform the forming operation, as compared to a configuration where the inner-side sub-concave groove 19 and the outer-side sub-concave groove 20 are formed by cutting processing or the like. Also, it is possible to effectively form the inner-side sub-concave groove and the outer-side sub-concave groove at portions, of which the circumferential phases coincide with the contact portions (the inner-side contact portion 28, the outer-side contact portion 36) between the rolling surface of each ball 11 and each of the inner-side and outer-side guide plates 17, 18, of the inner surfaces of the inner-side concave groove 12a and the outer-side concave groove 14a. Also, it is possible to suppress the manufacturing variations of the forming positions of the respective inner-side and outer-side sub-concave grooves 19, 20. Also, it is possible to easily process the sectional shape of each of the inner-side and outer-side sub-concave grooves 19, 20 into a shape conforming to a base line of the rolling surface of each ball 11 (so that the radius of curvature of the sectional shape of each of the inner-side and outer-side sub-concave grooves 19, 20 becomes the sum of the radius of curvature of the rolling surface of each ball 11 and the plate thickness of each of the inner-side and outer-side guide plates 17, 18). Therefore, in the third example, it is possible to easily form each of the inner-side and outer-side sub-concave grooves 19, 20 of which precisions of the forming positions and shapes are high, and to manufacture the transmission shaft 16 capable of effectively suppressing the rattling at low cost. In the meantime, the inner-side concave groove 12a and the outer-side concave groove 14a are slightly elastically deformed upon the formation of the respective inner-side and outer-side sub-concave grooves 19, 20 and spring back after the respective inner-side and outer-side sub-concave grooves 19, 20 are formed. However, since the spring back is very small, as compared to the amount of plastic deformation, it can be ignored.

The other configurations and operational effects are the same as the first example of the embodiment.

INDUSTRIAL APPLICABILITY

The transmission shaft of the present invention can be preferably applied to an intermediate shaft or a steering shaft of the constitutional members of a steering device for an automobile having an electric power steering device. Also, the transmission shaft of the present invention is not limited to the shaft configuring the steering device for an automobile, and can be implemented as a shaft for rotation transmission configuring a variety of rotational mechanical devices, such as a machine tool, a play equipment and the like.

Also, when implementing the present invention, the inner-side guide plate and the outer-side guide plate can be configured to have a cylindrical shape continuing over an entire circumference.

Also, when implementing the present invention, the number of places at which the plurality of balls is provided between the inner-side concave grooves and the outer-side concave grooves via the guide plates is not particularly limited inasmuch as it is one or more places.

Also, when implementing the present invention, at least one place of the total of the four places of the two places in the circumferential direction, of which phases in the circumferential direction coincide with the two inner-side contact portions, of the inner surface of the inner-side concave groove and the two places in the circumferential direction, of which phases in the circumferential direction coincide with the two outer-side contact portions, of the inner surface of the outer-side concave groove may be formed with the sub-groove. In this case, the place at which the sub-concave groove is to be formed may be only the two places of the inner surface of the inner-side concave groove or only the two places of the inner surface of the outer-side concave groove. Alternatively, when the torque to be transmitted between the inner shaft and the outer shaft is only unidirectional torque, the place may be only two places existing at diagonal positions to which the load from the rolling surface of the ball is to be applied when the torque is transmitted.

Figure 11:
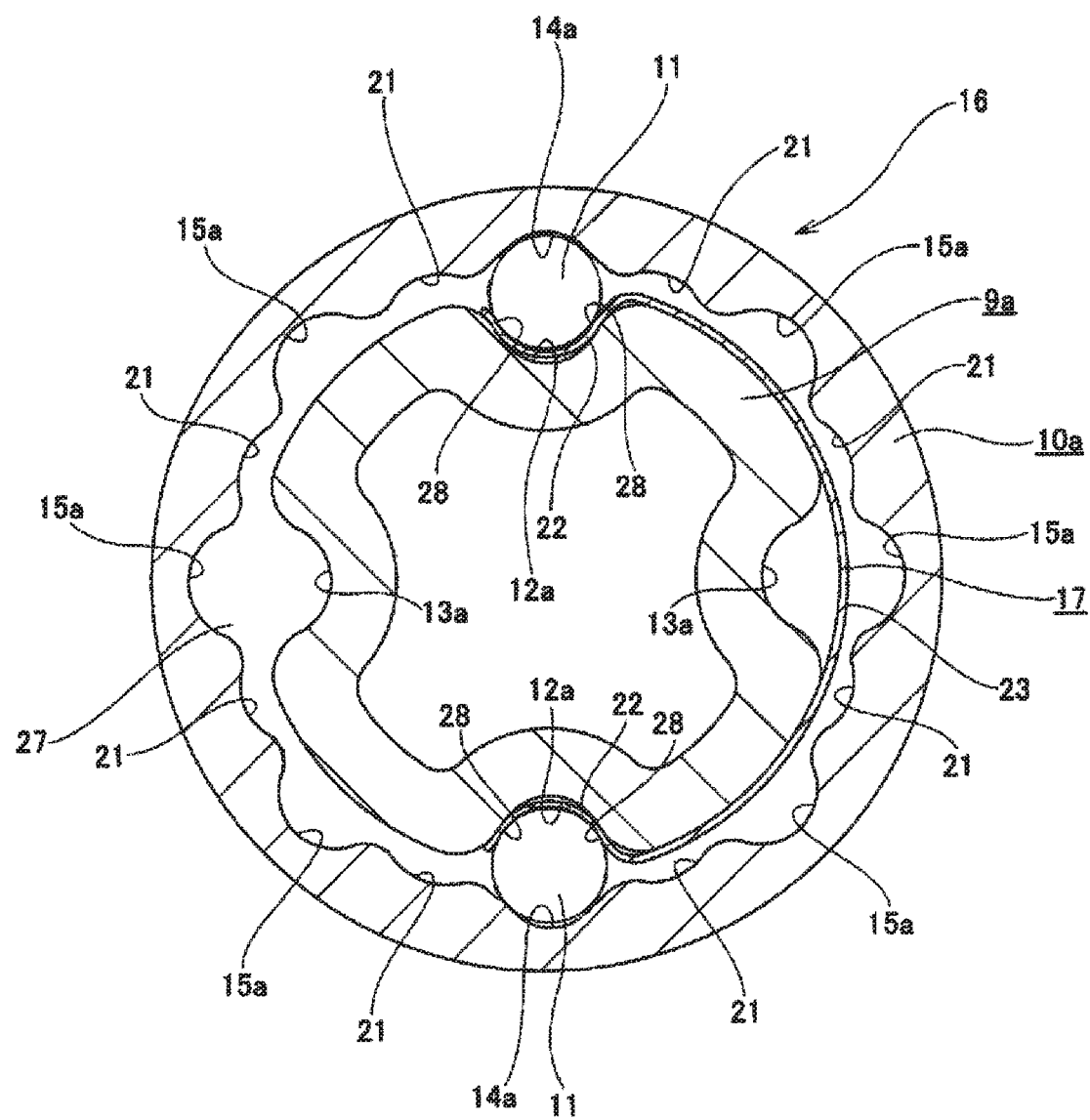
FIG. 11 is a sectional view depicting another embodiment in which only an inner-side guide plate is provided.

Also, the present invention can be applied to a structure where at least one of the inner-side guide plate and the outer-side guide plate is provided. For example, as shown in FIG. 11, only the inner-side guide plate may be provided. Also, only the outer-side guide plate may be provided. When only one guide plate is provided, the guide plate is configured as the target guide plate. Also, in this case, the rolling surface of each ball and the inner surface of each concave groove are directly contacted to each other at a side at which the guide plate is not provided. In contrast, when the two guide plates of the inner-side guide plate and the outer-side guide plate are provided, each of the inner-side guide plate and the outer-side guide plate can be configured as the target guide plate, like the respective examples of the embodiment, or only one guide plate of the two guide plates may be configured as the target guide plate.

Figure 12:
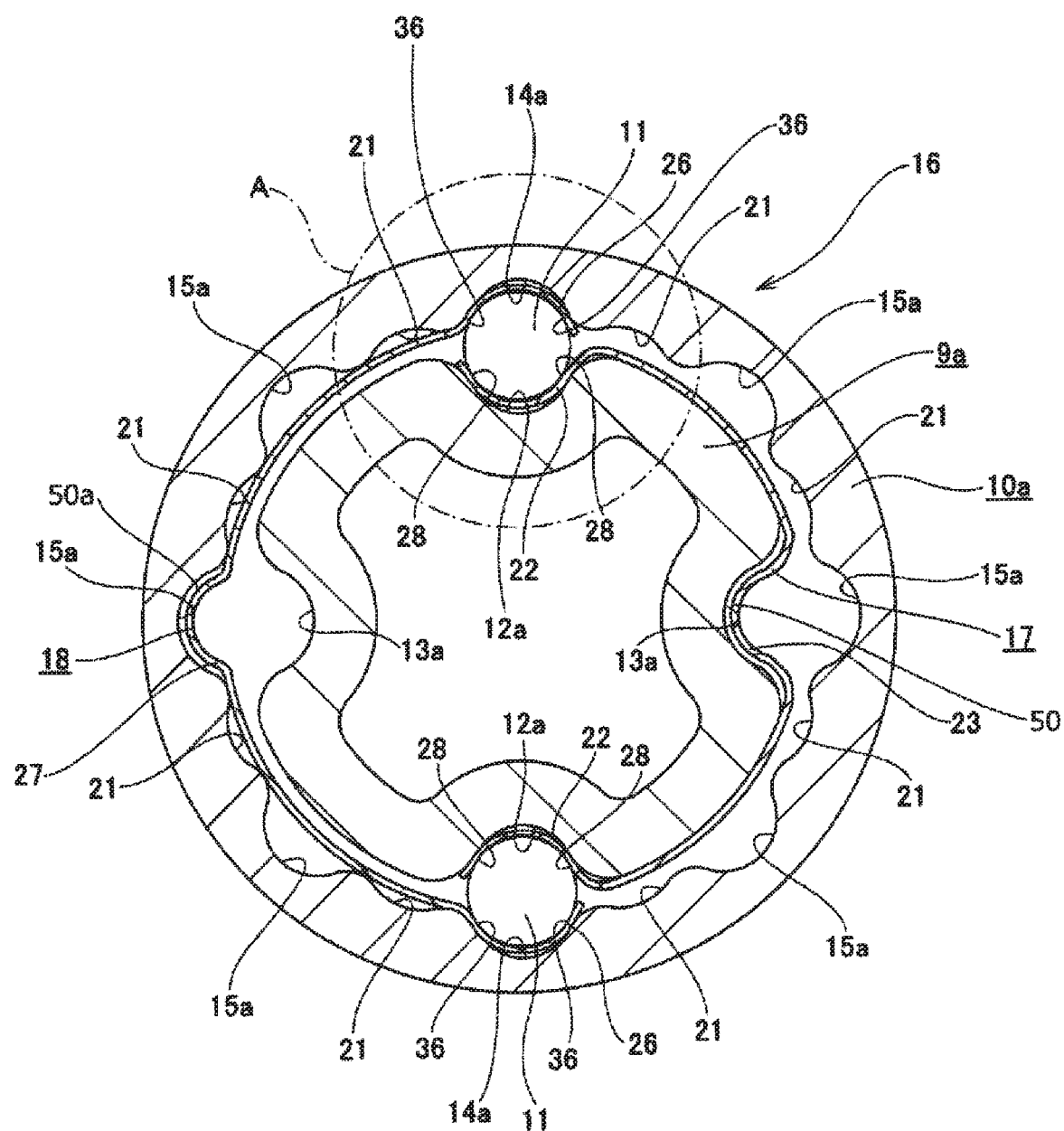
FIG. 12 is a view similar to FIG. 1, depicting a modified embodiment of the embodiment.

When implementing the present invention, as shown in a modified embodiment of FIG. 12, the inner-side guide plate 17 may be provided with a relief part 50 having a semi-circular arc shape and convex towards an inner diameter-side, and the outer-side guide plate 18 may be provided with a relief part 50*a* having a semi-circular arc shape and convex towards an outer diameter-side. A gap is formed between the relief part 50 and the inner-side preliminary concave groove 13*a*, and a gap is formed between the relief part 50*a* and the outer-side preliminary concave groove 15*a*. Since the inner-side guide plate 17 and the outer-side guide plate 18 are long in the circumferential direction, a dimensional error is likely to be caused when mounting the balls 11. The relief parts 50, 50*a* are provided, so that the inner-side guide plate 17 and the outer-side guide plate 18 are likely to be deformed and the dimensional error can be absorbed. In the meantime, the convex directions of the relief part 50 of the inner-side guide plate 17 and the relief part 50*a* of the outer-side guide plate 18 may be reversed.

The subject application is based on a Japanese Patent Application Publication No. 2015-147532 filed on Jul. 27, 2015, a Japanese Patent Application Publication No. 2016-001014 filed on Jan. 6, 2016, a Japanese Patent Application Publication No. 2016-013027 filed on Jan. 27, 2016, and a Japanese Patent Application Publication No. 2016-027464 filed on Feb. 17, 2016, which are herein incorporated by reference.

DESCRIPTION OF REFERENCE NUMERALS

1: steering wheel, 2: steering gear unit, 3: steering shaft, 4*a*, 4*b*: universal joint. 5: intermediate shaft, 6: input shaft. 7: tie-rod, 8: electric motor, 9, 9*a*: inner shaft, 10, 10*a*: outer shaft, 11: ball, 12, 12*a*: inner-side concave groove, 13, 13*a*: inner-side preliminary concave groove, 14, 14*a*: outer-side concave groove, 15, 15*a*: outer-side preliminary concave groove, 16: extensible rotation transmission shaft, 17: inner-side guide plate, 18: outer-side guide plate, 19: inner-side sub-concave groove, 20: outer-side sub-concave groove, 21: small concave groove, 22: inner-side guide main body part, 23: inner-side coupling part, 24, 24*a*: large-diameter cylindrical portion, 25, 25*a*: small-diameter cylindrical portion, 26: outer-side guide main body part, 27: outer-side coupling part, 28: inner-side contact portion. 29: inner-side curved portion, 30: first inner-side non-contact portion, 31: first inner-side gap, 32: second inner-side gap, 33: second inner-side non-contact portion, 34: third inner-side gap, 35: fourth inner-side gap, 36: outer-side contact portion, 37: outer-side curved portion, 38: first outer-side non-contact portion, 39: first outer-side gap, 40: second outer-side gap, 41: second outer-side non-contact portion, 42: third outer-side gap, 43: fourth outer-side gap, 44, 44*a*: gap, 45: guide plate. 46: concave groove, 47: ball, 50, 50*a*: relief part

The invention claimed is:

1. An extensible rotation transmission shaft comprising:
    an inner shaft formed with an axial inner-side concave groove at at least one place of an outer peripheral surface thereof in a circumferential direction;
    an outer shaft formed with an axial outer-side concave groove at at least one place of an inner peripheral surface thereof in a circumferential direction, at which it is aligned with the inner-side concave groove;
    a plurality of balls arranged axially side by side between the inner-side concave groove and the outer-side concave groove; and
    a guide plate interposed between a rolling surface of each ball and an inner surface of the inner-side concave groove and/or between the rolling surface of each ball and an inner surface of the outer-side concave groove,
    wherein one radial surface, which is positioned at the rolling surface-side of each ball, of a target guide plate, which is at least one guide plate of the guide plates, and the rolling surface of each ball are contacted only at two contact portions spaced in the circumferential direction with a central portion in the circumferential direction being interposed therebetween,
    wherein the inner surface of the inner-side concave groove or the outer-side concave groove, which faces the other radial surface of the target guide plate positioned at a side opposite to the rolling surface of each ball, is formed with a sub-concave groove at at least one place of two places in the circumferential direction of which phases in the circumferential direction coincide with the two contact portions, and,
    wherein a portion of the target guide plate interposed between the rolling surface of each ball and an inner surface of the sub-concave groove is supported at the other radial surface opposite to the rolling surface of each ball by the inner surface of the sub-concave groove at a state where one radial surface facing towards the rolling surface of each ball is pressed by the rolling surface of each ball and is thus curved along the rolling surface of each ball.

2. The extensible rotation transmission shaft according to claim 1,
    wherein a sectional shape of the inner surface of the sub-concave groove is formed into a circular arc shape, and
    wherein a radius of curvature of the circular arc-shaped section is greater than a sum of a radius of curvature of the rolling surface of each ball and a plate thickness of the portion of the target guide plate interposed between the rolling surface of each ball and the inner surface of the sub-concave groove.

3. The extensible rotation transmission shaft according to claim 1,
    wherein each ball is applied with preload by plastically deforming an inner surface of at least one concave groove of the inner-side concave groove and the outer-side concave groove in a radial direction.

4. A method of manufacturing the extensible rotation transmission shaft according to claim 1,
    wherein a portion of the target guide plate interposed between the rolling surface of each ball and the inner surface of the sub-concave groove is formed into a shape where the other radial surface opposite to the rolling surface of each ball is not contacted to the inner surface of the sub-concave groove at a state before assembling the extensible rotation transmission shaft, and is curved until the other radial surface opposite to the rolling surface of each ball is contacted to the inner surface of the sub-concave groove by pressing one radial surface facing towards the rolling surface of each ball by the rolling surface of each ball when assembling the extensible rotation transmission shaft.

5. A method of manufacturing the extensible rotation transmission shaft according to claim 1,
    wherein the sub-concave groove is formed by pressing an inner surface of the concave groove, which faces the other radial surface of the target guide plate, of the inner-side concave groove or the outer-side concave groove by the rolling surface of each ball via the portion of the target guide plate interposed between the inner surface of the concave groove and the rolling surface of each ball and plastically deforming the inner surface of the concave groove.

6. The method of manufacturing the extensible rotation transmission shaft according to claim 5, wherein the sub-concave groove is formed to be axially continuous by relatively displacing the outer shaft and the inner shaft in the axial direction.

7. The method of manufacturing the extensible rotation transmission shaft according to claim 5,
wherein the sub-concave groove is formed by transmitting torque between the inner shaft and the outer shaft at a state where the inner shaft being is inserted into the outer shaft.

8. The method of manufacturing the extensible rotation transmission shaft according to claim 5,
wherein the sub-concave groove is formed by relatively displacing the inner shaft and the outer shaft so that central axes of the inner shaft and the outer shaft are mismatched at a state where the inner shaft is inserted into the outer shaft.

9. The method of manufacturing the extensible rotation transmission shaft according to claim 5,
wherein the sub-concave groove is formed before the extensible rotation transmission shaft is mounted to a vehicle.

10. The method of manufacturing the extensible rotation transmission shaft according to claim 5,
wherein the sub-concave groove is formed after the extensible rotation transmission shaft is mounted to a vehicle.

11. The method of manufacturing the extensible rotation transmission shaft according to claim 5,
wherein hardness of the shaft, which is formed with the sub-concave groove, of the inner shaft or the outer shaft is lower than hardness of each ball and hardness of the target guide plate.

12. The method of manufacturing the extensible rotation transmission shaft according to claim 5,
wherein an inner-side guide plate, which is interposed between the rolling surface of each ball and the inner surface of the inner-side concave groove, and an outer-side guide plate, which is interposed between the rolling surface of each ball and the inner surface of the outer-side concave groove, are respectively configured as the target guide plate, and
wherein the sub-concave groove is respectively formed on the inner surface of the inner-side concave groove and the inner surface of the outer-side concave groove.

13. The method of manufacturing the extensible rotation transmission shaft according to claim 5,
wherein the inner-side guide plate interposed between the rolling surface of each ball and the inner surface of the inner-side concave groove is configured as the target guide plate, and
wherein the sub-concave groove is formed only on the inner surface of the inner-side concave groove.

14. The method of manufacturing the extensible rotation transmission shaft according to claim 5,
wherein the outer-side guide plate interposed between the rolling surface of each ball and the inner surface of the outer-side concave groove is configured as the target guide plate, and
wherein the sub-concave groove is formed only on the inner surface of the outer-side concave groove.

* * * * *